US011762474B2

United States Patent
Zhang et al.

(10) Patent No.: US 11,762,474 B2
(45) Date of Patent: Sep. 19, 2023

(54) SYSTEMS, METHODS AND DEVICES FOR GESTURE RECOGNITION

(71) Applicant: Georgia Tech Research Corporation, Atlanta, GA (US)

(72) Inventors: Cheng Zhang, Atlanta, GA (US); Gregory D. Abowd, Atlanta, GA (US); Omer Inan, Atlanta, GA (US); Pranav Kundra, Atlanta, GA (US); Thomas Ploetz, Atlanta, GA (US); Yiming Pu, Atlanta, GA (US); Thad Eugene Starner, Atlanta, GA (US); Anandghan Waghmare, Atlanta, GA (US); Xiaoxuan Wang, Atlanta, GA (US); Kenneth A. Cunnefare, Atlanta, GA (US); Qiuyue Xue, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 226 days.

(21) Appl. No.: 16/644,651

(22) PCT Filed: Sep. 6, 2018

(86) PCT No.: PCT/US2018/049740
§ 371 (c)(1),
(2) Date: Mar. 5, 2020

(87) PCT Pub. No.: WO2019/051082
PCT Pub. Date: Mar. 14, 2019

(65) Prior Publication Data
US 2021/0109598 A1     Apr. 15, 2021

Related U.S. Application Data

(60) Provisional application No. 62/568,417, filed on Oct. 5, 2017, provisional application No. 62/554,686, filed on Sep. 6, 2017.

(51) Int. Cl.
*G06F 3/01* (2006.01)
*G06F 3/0346* (2013.01)
(Continued)

(52) U.S. Cl.
CPC .............. *G06F 3/017* (2013.01); *G06F 3/014* (2013.01); *G06F 3/0346* (2013.01); *G06F 3/16* (2013.01);
(Continued)

(58) Field of Classification Search
CPC combination set(s) only.
See application file for complete search history.

(56) References Cited

U.S. PATENT DOCUMENTS

| 6,006,175 A | 12/1999 | Holzrichter | |
| 2003/0056278 A1* | 3/2003 | Kuo | G06F 3/0219 2/163 |

(Continued)

OTHER PUBLICATIONS

Search Report and Written Opinion from PCT application No. PCT/US2018/049740 dated Nov. 28, 2018 (14 pages).

*Primary Examiner* — William Boddie
*Assistant Examiner* — Alecia D English
(74) *Attorney, Agent, or Firm* — Troutman Pepper Hamilton Sanders LLP; Ryan A. Schneider; Sarah M L Wilkening

(57) ABSTRACT

A method including receiving sound data captured by a wearable device of the user, the sound data indicative of contact between a first portion of the user wearing the wearable device and a second portion of the user wearing the wearable device; receiving motion data captured by the wearable device of the user, the motion data indicative of at least a movement of the first portion of the user wearing the wearable device; and determining, by a processor, based at least in part on the sound data and the motion data, a user input associated with the contact between a first portion of (Continued)

the user wearing the wearable device and a second portion of the user wearing the wearable device and the movement of the first portion of the user wearing the wearable device.

14 Claims, 33 Drawing Sheets

(51) Int. Cl.
  *G06F 3/16* (2006.01)
  *H04R 1/08* (2006.01)
(52) U.S. Cl.
  CPC ........ *G06F 2203/0331* (2013.01); *H04R 1/08* (2013.01)

(56) References Cited

U.S. PATENT DOCUMENTS

| | | |
|---|---|---|
| 2009/0265671 A1 | 10/2009 | Sachs et al. |
| 2010/0220054 A1 | 9/2010 | Noda et al. |
| 2011/0133934 A1* | 6/2011 | Tan ......................... G06F 3/017 340/573.1 |
| 2012/0001875 A1* | 1/2012 | Li ........................... G01S 7/5273 345/177 |
| 2012/0126972 A1* | 5/2012 | Rott ........................ G06F 3/016 340/539.11 |
| 2012/0319940 A1 | 12/2012 | Bress et al. |
| 2013/0135223 A1* | 5/2013 | Shai ........................ G06F 3/014 345/173 |
| 2014/0139454 A1 | 5/2014 | Mistry et al. |
| 2015/0128094 A1* | 5/2015 | Baldwin ................. G06F 3/017 715/863 |
| 2015/0326985 A1* | 11/2015 | Priyantha .............. H02J 50/001 381/56 |
| 2015/0370326 A1* | 12/2015 | Chapeskie .............. G06F 1/163 345/156 |
| 2016/0252970 A1 | 9/2016 | Dahl |
| 2016/0292563 A1* | 10/2016 | Park ..................... G06F 3/04883 |
| 2016/0313798 A1 | 10/2016 | Connor |
| 2017/0003721 A1* | 1/2017 | Villien ..................... G06F 3/017 |
| 2018/0350378 A1* | 12/2018 | Bullough ............. G10L 21/0208 |

* cited by examiner

FIG. 24A

SYSTEMS, METHODS AND DEVICES FOR GESTURE RECOGNITION

CROSS-REFERENCE TO RELATED APPLICATIONS

This application, filed Sep. 6, 2018, claims the benefit of U.S. Provisional Patent Application Ser. No. 62/568,417, filed Oct. 5, 2017, entitled "FingerSonar: Recognizing Fine-Grained Hand Poses Using Active Acoustic On-Body Sensing," and U.S. Provisional Patent Application Ser. No. 62/554,686, filed Sep. 6, 2017, entitled "Recognition and Interaction with Wearables Using Unistroke Thumb Movements," and the entire contents and substance of which are hereby incorporated by reference as if fully set forth below.

BACKGROUND

The small physical size of wearable devices limits the user experience, preventing full engagement with wearable technology compared to smartphones, tablets, or laptops. Since user-device interaction is currently dominated by touch-based methods, the size of the touchscreen relative to the finger imposes significant restrictions on the interaction. Simple operations, such as pressing a button to answer a call can be performed; but, more powerful interactions such as multi-touch or gesture-based text input are difficult. Accordingly, there is a need to extend the input to a larger space that has the potential to support a rich set of input gestures.

BRIEF SUMMARY

Embodiments of the present disclosure can include a wearable device for providing extended user input, the device comprising: a receiver configured to capture sound data indicative of contact between a first portion of the user wearing the wearable device and a second portion of the user wearing the wearable device; a sensor configured to capture motion data indicative of at least a movement of the first portion of the user wearing the wearable device; and wherein a combination of at least a portion of the sound data and at least a portion of the motion data is sufficient to enable at least one of a remote device and the wearable device to determine a user input, the user input associated with the contact between the first portion of the user wearing the wearable device and the second portion of the user wearing the wearable device and the movement of the first portion of the user wearing the wearable device.

In some embodiments, the wearable device further comprises a microcontroller configured transmit the combination of at least a portion of the sound data and at least a portion of the motion data to the remote device, wherein the combination of at least a portion of the sound data and at least a portion of the motion data is sufficient to enable the remote device to determine the user input.

In some embodiments, the wearable device further comprises a microcontroller configured to determine the user input based at least in part on the combination of at least a portion of the sound data and at least a portion of the motion data.

In some embodiments, the wearable device further comprises an amplifier configured to receive the sound data from the receiver and increase an amplitude of the sound data.

In some embodiments, the wearable device further comprises a filter configured to filter the sound data to remove data that is not associated with the movement of the user wearing the wearable device.

In some embodiments, the wearable device is a ring configured to be positioned about a finger of the user.

In some embodiments, the wearable device is a ring adjustable in size.

In some embodiments, the wearable device is a ring comprising velcro.

Embodiments of the present disclosure can include a method for sensing and communicating data, the method comprising: receiving sound data captured by a wearable device of the user, the sound data indicative of contact between a first portion of the user wearing the wearable device and a second portion of the user wearing the wearable device; receiving motion data captured by the wearable device of the user, the motion data indicative of at least a movement of the first portion of the user wearing the wearable device; and determining, by a processor, based at least in part on the sound data and the motion data, a user input associated with the contact between a first portion of the user wearing the wearable device and a second portion of the user wearing the wearable device and the movement of the first portion of the user wearing the wearable device.

In some embodiments, sensing and communicating data may further include integrating, by the processor, the sound data and the motion data within a data structure; analyzing, by the processor, the integrated sound data and motion data to identify the user input; and determining, by the processor, whether the user input is representative of one or more of a plurality of recognized gestures.

In some embodiments, the integrated sound data and motion data comprises: sound data indicative of sound occurring prior to and after the contact between the first portion of the user wearing the wearable device and the second portion of the user wearing the wearable device; and motion data indicative of motion of the first portion of the user occurring prior to and after the contact between the first portion of the user wearing the wearable device and the second portion of the user wearing the wearable device.

In some embodiments, determining whether the user input is representative of one or more of a plurality of recognized gesture comprises, determining whether at least a portion of the integrated sound and motion data has a length exceeding a minimum gesture length.

In some embodiments, the first portion of the user is at least one finger of the user and the second portion of the user is at least a portion of a palm or at least one other finger of the user.

In some embodiments, the processor is located on the wearable device.

In some embodiments, the processor is located on a remote device. In those embodiments, the method further comprises transmitting the sound data and the motion data from the wearable device to the remote device.

In some embodiments, the remote device is wearable by the user.

In some embodiments, the remote device is a smartwatch.

In some embodiments, the wearable device is a ring.

Further features of the disclosed design, and the advantages offered thereby, are explained in greater detail hereinafter with reference to specific embodiments illustrated in the accompanying drawings, wherein like elements are indicated be like reference designators

BRIEF DESCRIPTION OF THE DRAWINGS

Reference will now be made to the accompanying figures, which are not necessarily drawn to scale, and wherein:

FIG. 24A-B show a confusion matrix for recognizing a plurality of phalange poses and a plurality of American Sign Language poses, respectively, in accordance with one or more embodiments of the present disclosure.

DETAILED DESCRIPTION

Figure 1:
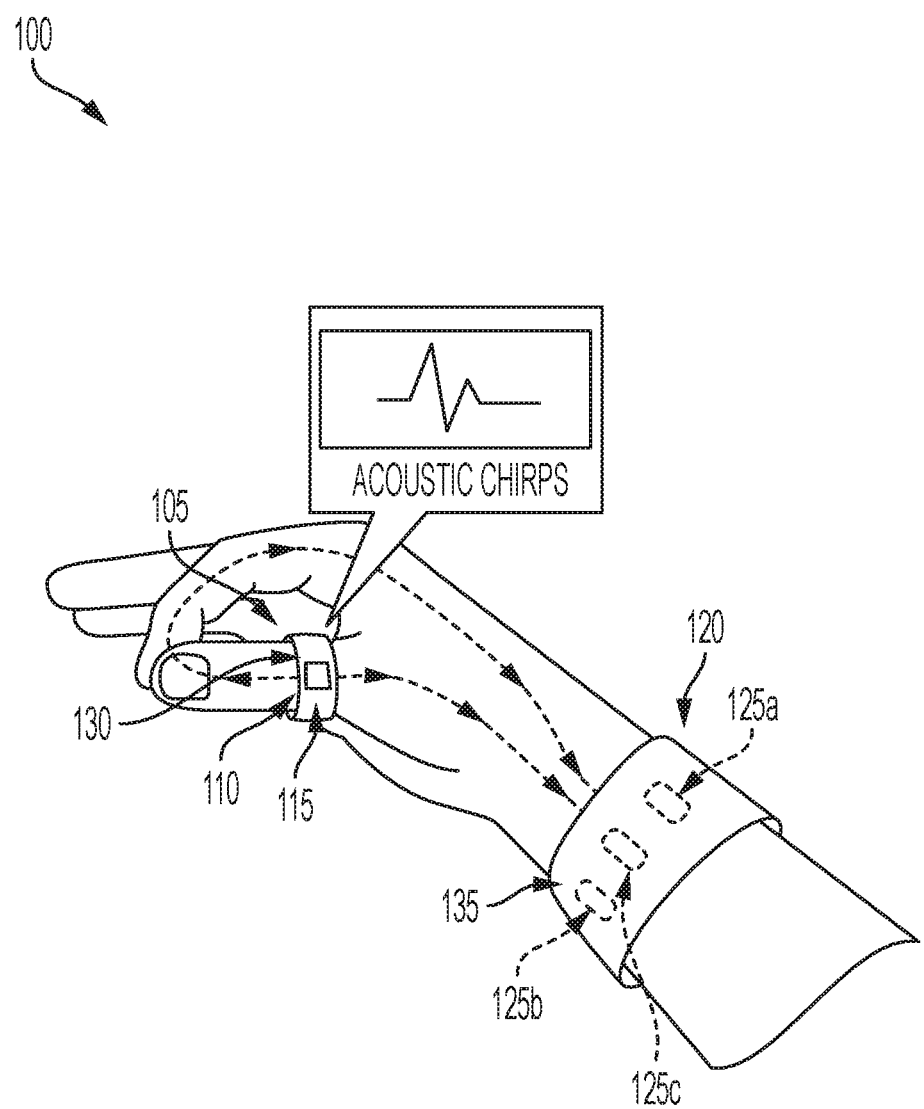
FIG. 1 illustrates a system for sensing and communicating data, in accordance with one or more embodiments of the present disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

In an example scenario, a user wears a wearable device (e.g., ring) on his thumb. The wearable device has a receiver and a sensor that receive sound information and movement information, respectively. Further, the wearable device has a processor that interprets the movements and sounds (e.g., sound generated when the thumb makes contact with a finger and/or palm) occurring while the user moves his thumb with the ring on. The processor determines whether the movements and sounds are consistent with a gesture. If the movements and sounds are consistent with a gesture, the processor associates the gesture from amongst several predetermined gestures. Once the processor determines the gesture, the wearable device communicates the gesture with a second device (e.g., smartwatch). The second device can then use the gesture as a user input. For example, an option may be present on a smartwatch to enter a credit card number. Rather than attempting to input the numbers by pressing the small buttons on the smart watch, the user can make several movements of his thumb about his hand to enter the requested information.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 illustrates a system for sensing and communicating data. The components and arrangements shown in FIG. 1 are not intended to limit the disclosed embodiments as the components used to implement the disclosed processes and features may vary. As shown in FIG. 1, in some implementations the system 100 includes a ring 105, a wearable device 120, and audio interface 130. The ring 105 may be adjustable in size. The ring 105 may be comprised of velcro or any other material capable of providing the ring 105 an adjustable size. The ring 105 may include one or more transducers 110 and/or one or more receivers 115. In some embodiments, the ring 105 may include an audio interface 130. In some embodiments, the audio interface 130 may be located on a remote device. The transducer 110 may emit sound into the hand of the user. In some embodiments, the transducer 110 may emit a plurality of chirps. The one or more receivers 115 may receive first sound data. The first sound data may be based on the emitted sound and a position of contact between a first portion of the user and a second portion of the user. In some embodiments, the first portion of the user may a thumb of the user. The second portion of the user may include a palm and/or one or more fingers of the user.

The wearable device 120 may include one or more receivers 125a, 125b, and/or 125c. The wearable device 120 may include a processor 135. The processor 135 may receive first sound data from the ring 105 and second sound data from the plurality of receivers 125a, 125b, and/or 125c. The processor 135 may analyze the first and second sound data to determine the user input. The user input may be used in association with an application of the wearable device 120. The wearable device 120 may be adjustable in size. In some embodiments, the audio interface 130 may be located on the wearable device 120. The audio interface 130 receive first and second sound data. The first and second sound data may be sufficient to identify a user input associated with the position of a contact between a first portion of the user and a second portion of the user.

Figure 2:
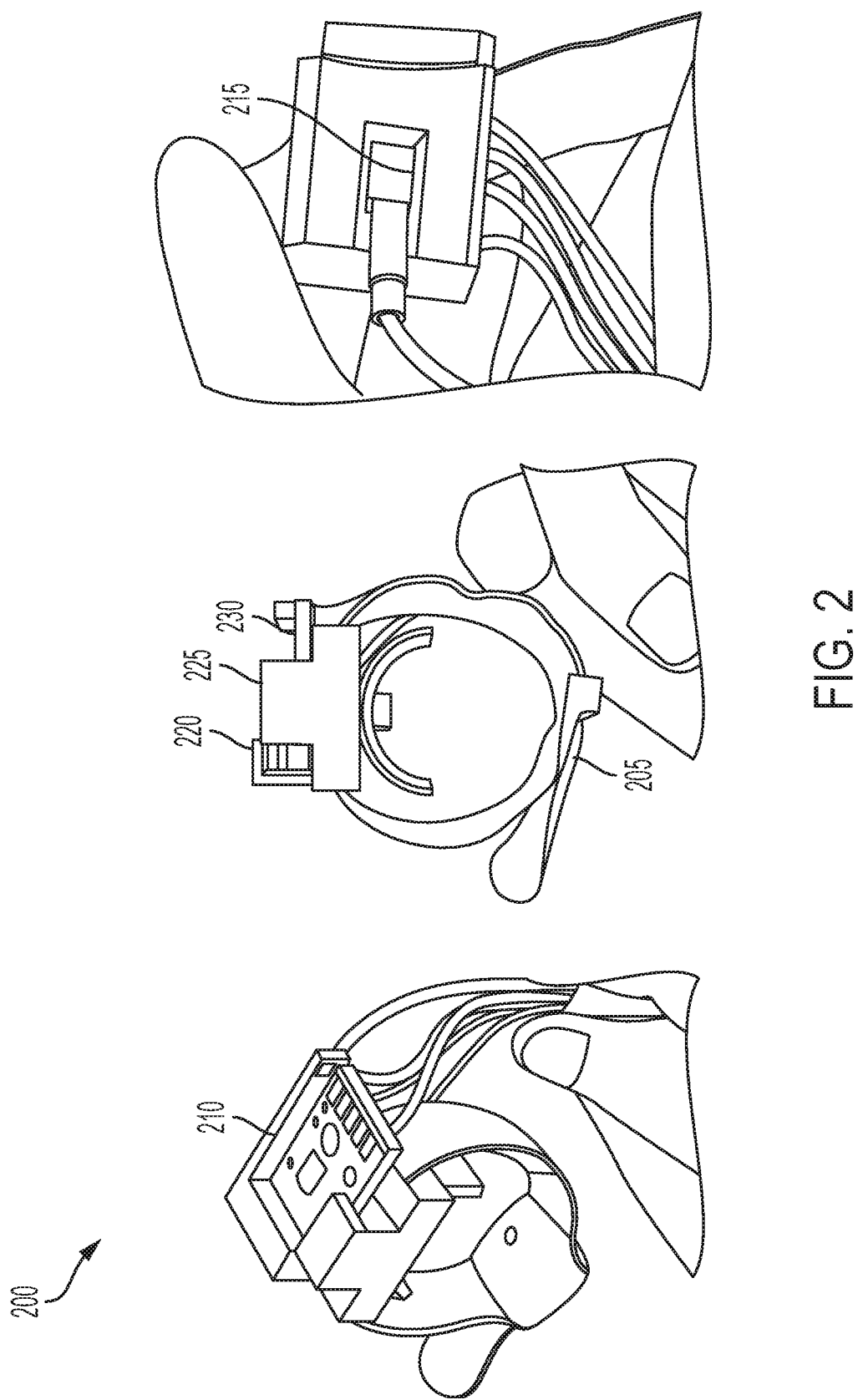
FIG. 2 illustrates a wearable device for providing extended user input, in accordance with one or more embodiments of the present disclosure.

FIG. 2 illustrates a wearable device for providing extended user input. Wearable device 205 may include a receiver 215 and a sensor 210. The wearable device 205 may further include a microcontroller 220, an amplifier 225, and/or a filter 230. In some embodiments, the wearable device 205 is a ring configured to be positioned about a finger of the user. The ring may be adjustable in size. The ring may be comprised of velcro or any other material or any other material capable of providing the ring 105 an adjustable size. The receiver 215 may capture sound data. The sound data may be indicative of contact between a first portion of the user wearing the wearable device and a second portion of the user wearing the wearable device. The sensor 210 may capture motion data. The motion data may be indicative of at least a movement of the first portion of the user wearing the wearable device 205. According to some embodiments, a combination of at least a portion of the sound data and at least a portion of the motion data is sufficient to enable a remote device and the wearable device 205 to determine a user input. The user input may be associated with the contact between the first portion of the user wearing the wearable device 205 and the second portion of the user wearing the wearable device 205 and the movement of the first portion of the user wearing the wearable device 205. The first portion of the user may include a thumb of the user. The second portion of the user may include a palm and/or at least one finger of the user. The microcontroller 220 may transmit a combination of at least a portion of the sound data and at least a portion of the motion data to a remote device. The combination of at least a portion of the sound data and at least a portion of the motion data may be sufficient to enable the remote device to determine the user input. The microcontroller 220 may determine the user input based at least in part on the combination of at least a portion of the sound data and at least a portion of the motion data. The amplifier 225 may receive the sound data from the receiver. The amplifier 225 may increase an amplitude of the received sound data. The filter 230 may filter the sound data to remove data that is not associated with the movement of the user wearing the wearable device.

Figure 3:
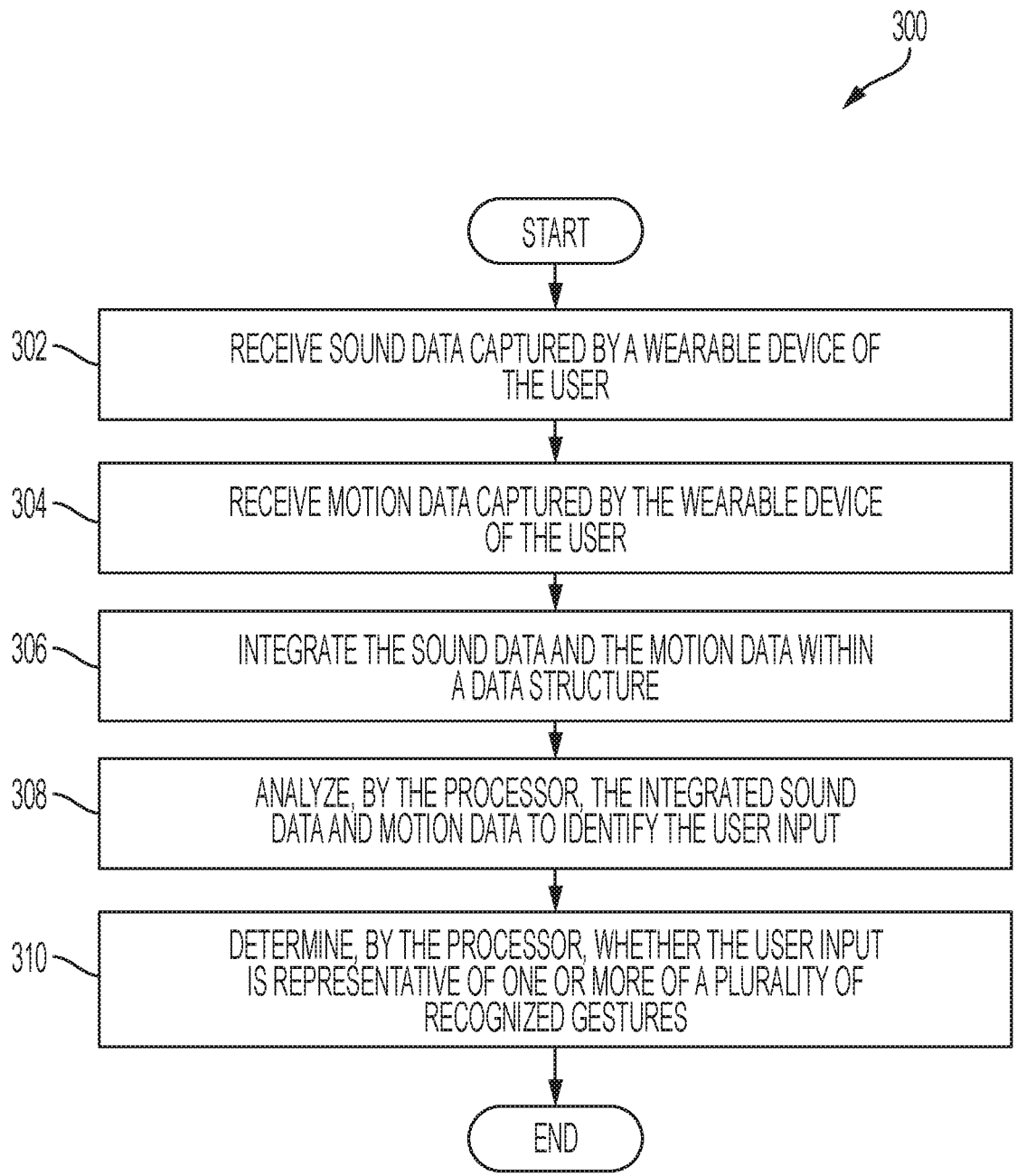
FIG. 3 is an example flow chart of a method for sensing and communicating data, in accordance with one or more embodiments of the present disclosure.

FIG. 3 shows an example flow chart of a method for sensing and communicating data. At 302, sound data captured by wearable device 120 of the user is received. The sound data may be indicative of contact between a first portion of the user wearing the wearable device 120 and a second portion of the user wearing the wearable device 120. The first portion of the user may include a thumb of the user. The second portion of the user may include a palm and/or at least one finger of the user. In some embodiments, the wearable device 120 is a ring. At 304, motion data captured by wearable device 120 of the user is received. The motion data may be indicative of at least a movement of the first portion of the user wearing the wearable device 120. At 306, the processor 135 may integrate the sound data and the motion data within a data structure. The processor 135 may be located on the wearable device 120. In some embodiments, the processor 135 may be located on a remote device. In such embodiments, the sound and motion data are transmitted from the wearable device 120 to a remote device. The remote device may be wearable by the user. The remote device may be smartwatch, smartphone, GoogleGlass®, and/or the like. The integrated sound data may include sound data indicative of sound occurring prior to and/or after the contact between the first portion of the user wearing the wearable device 120 and the second portion of the user wearing the wearable device 120. The integrated sound data may further include motion data indicative of motion of the first portion of the user occurring prior to and/or after the contact between the first portion of the user wearing the wearable device 120 and the second portion of the user wearing the wearable device 120. The processor 135 may analyze the integrated sound data and motion data to identify the user input at 308. At 310, the processor 135 may determine whether the user input is representative of one or more of a plurality of recognized gestures. Determining whether the user input is representative of one or more of a plurality of recognized gestures may involve determining whether at least a portion of the integrated sound and motion data has a length exceeding a minimum gesture length.

Figure 4:
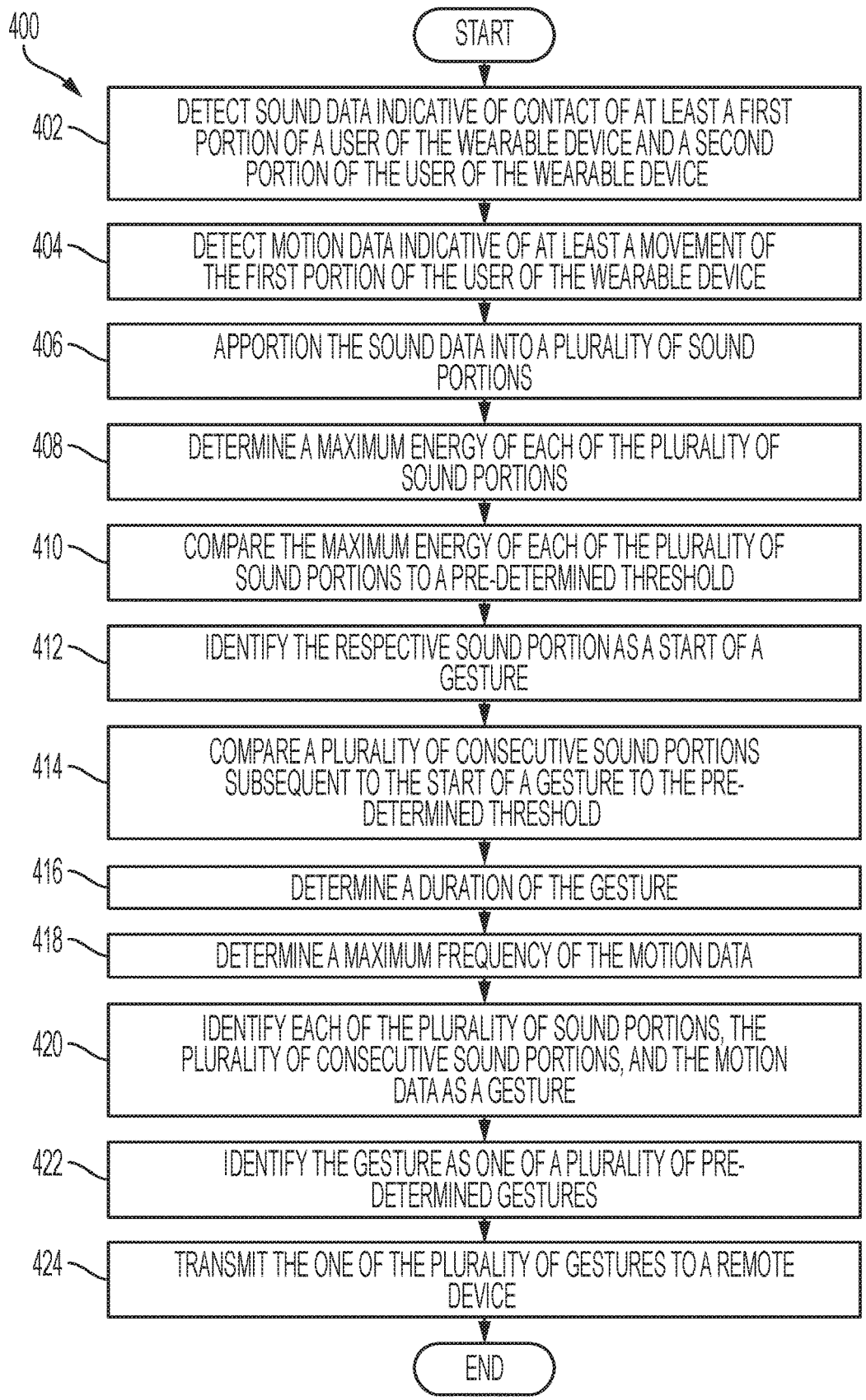
FIG. 4 is an example flow chart of a method for determining a gesture, in accordance with one or more embodiments of the present disclosure.

FIG. 4 shows an example flow chart of a method for determining a gesture. At 402, receiver 215 detects sound data indicative of contact of at least a first portion of a user of the wearable device 205 and a second portion of the user of the wearable device 205. In some embodiments, the first portion of the user may be one or more fingers of the user and the second portion of the user may be a palm of the user and/or one or more fingers of the user. At 404, the sensor 210 detects motion data indicative of at least a movement of the first portion of the user of the wearable device 205. The sound data may be apportioned into a plurality of sound portions at 406. According to some embodiments, each of the plurality of sound portions may be apportioned into sound portions of 100 ms. At 408, the maximum energy of each of the plurality of sound portions is determined. At 410, the maximum energy of each of the plurality of sound portions is compared to a pre-determined threshold. At 412, the respective sound portion may be identified as a start of a gesture. Identifying the start of a gesture may include finding the maximum energy of at least one of the plurality of sound portions exceeds the pre-determined threshold. At 414, a plurality of consecutive sound portions subsequent to the start of a gesture are compared to the pre-determined threshold. At 416, responsive to the plurality of consecutive sound portions having a maximum energy equal to or greater than the pre-determined threshold, a duration of the gesture is determined. When the gesture exceeds the pre-determined length of time, the motion data may be analyzed. For instance, at 418 analyzing the motion data may include determining a maximum frequency of the motion data. At 420, responsive to the maximum frequency of the motion data falling with a specified range the following are identified: each of the plurality of sound portions; the plurality of consecutive sound portions; and the motion data as a gesture. In some embodiments, the specified range is 0.5 Hz-4.4 Hz, but the invention is not so limited. Other embodiments can use frequency ranges below 0.5 Hz and/or above 4.4 Hz. At 422, based on the maximum frequency, the gesture is identified as one of a plurality of pre-determined gestures. At 424, the one of the plurality of gestures is transmitted to a remote device.

Figure 5:
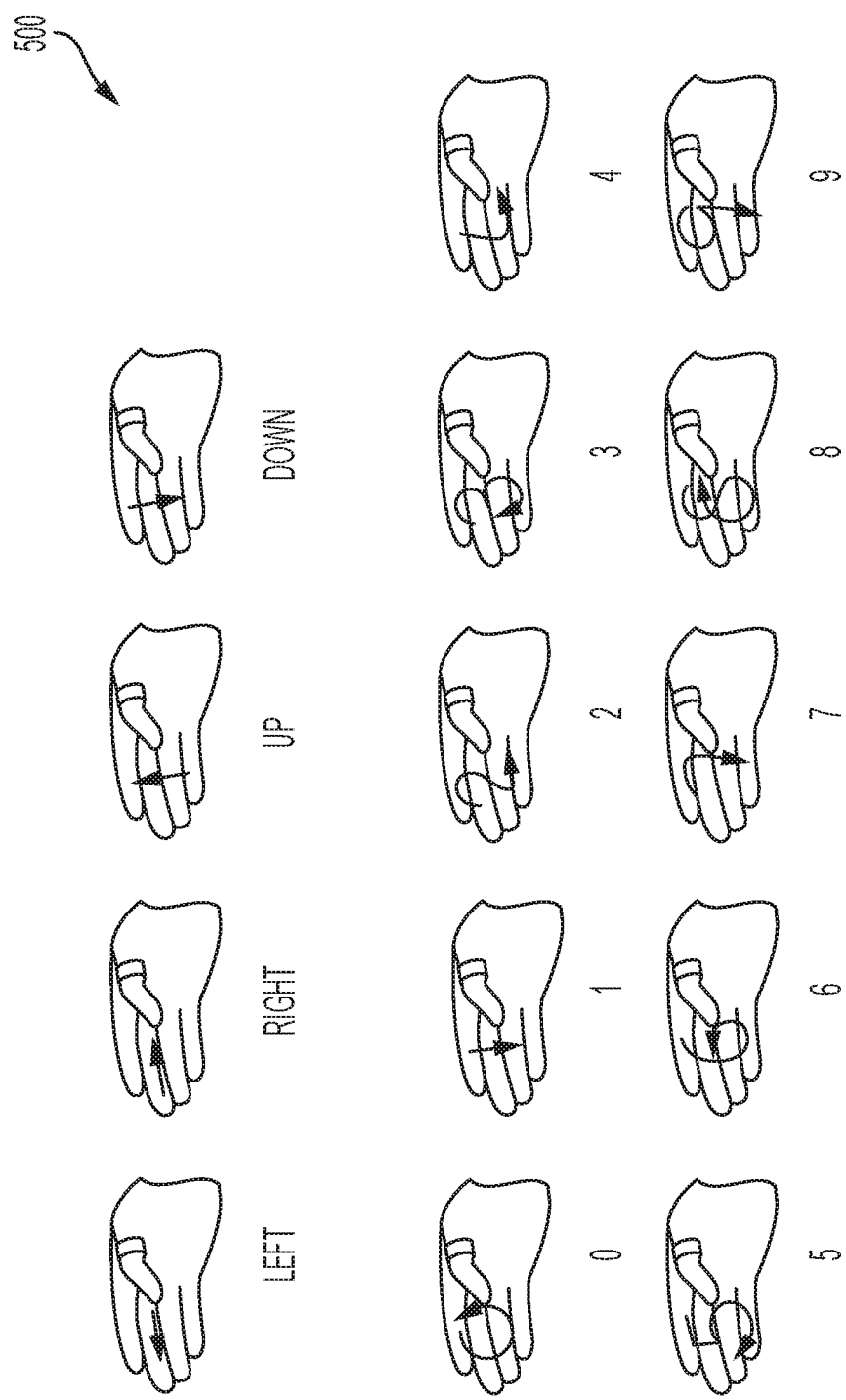
FIG. 5 shows various gestures and movements of a user of a wearable device, in accordance with one or more embodiments of the present disclosure.

FIG. 5 shows various gestures and movements of a user of a wearable device. As shown, using the wearable device 205 various unistroke gestures (e.g., directional controls, the digits 0-9, and the letters of the alphabet) may be performed by the user subtly. The arrow shows the movement of the thumb of the user wearing the wearable device 205. The letters of the alphabet may include an "X" drawn by the user wearing the wearable device 205 on his thumb by moving his thumb against his palm in an "X" pattern. When the wearable device 205 is paired with a smartphone, drawing an "X" in response to an incoming call may be interpreted as sending the call to voicemail. In another instance, the user wearing the wearable device 205 on his thumb may move his thumb against his palm in an "K" pattern which may be interpreted as acceptance of an invite received on a smartphone.

Figure 6:
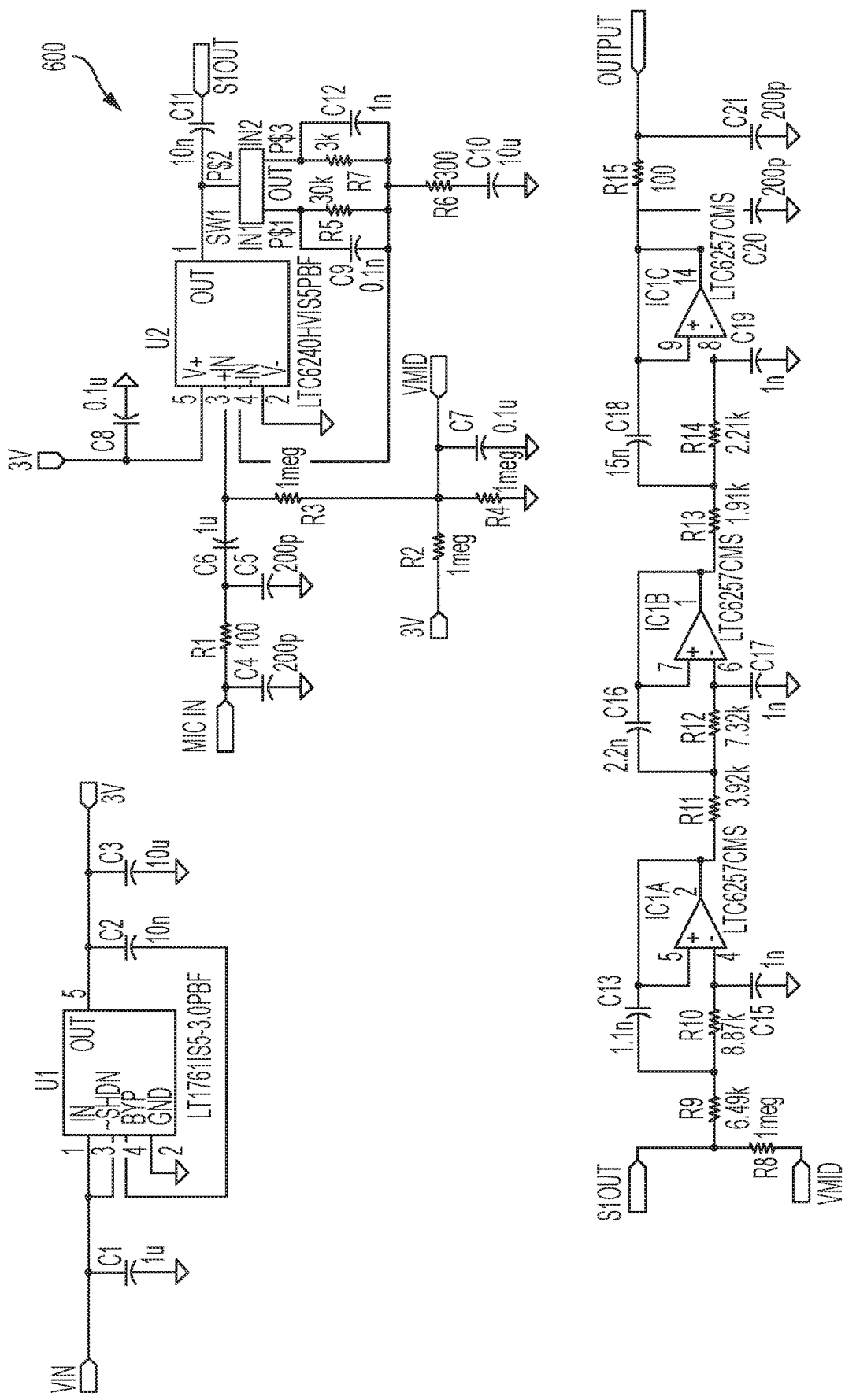
FIG. 6 illustrates an amplifier circuit of a wearable device, in accordance with one or more embodiments of the present disclosure.

FIG. 6 illustrates an amplifier circuit of a wearable device. The amplifier circuit may allow the wearable device 205 to capture a signal (e.g., sound data) effectively. The amplifier circuit may include a pre-amplifier board which amplifies the signal by over 100 times, and then filters the audio signal before transmitting it. In some embodiments, the output of the pre-amplifier is transmitted to a remote device. The remote device may include a laptop. Transmission may further involve sending the output of the pre-amplifier via a USB sound card. The sampled frequency of the signal may be 44, 100 Hz.

Figure 7:
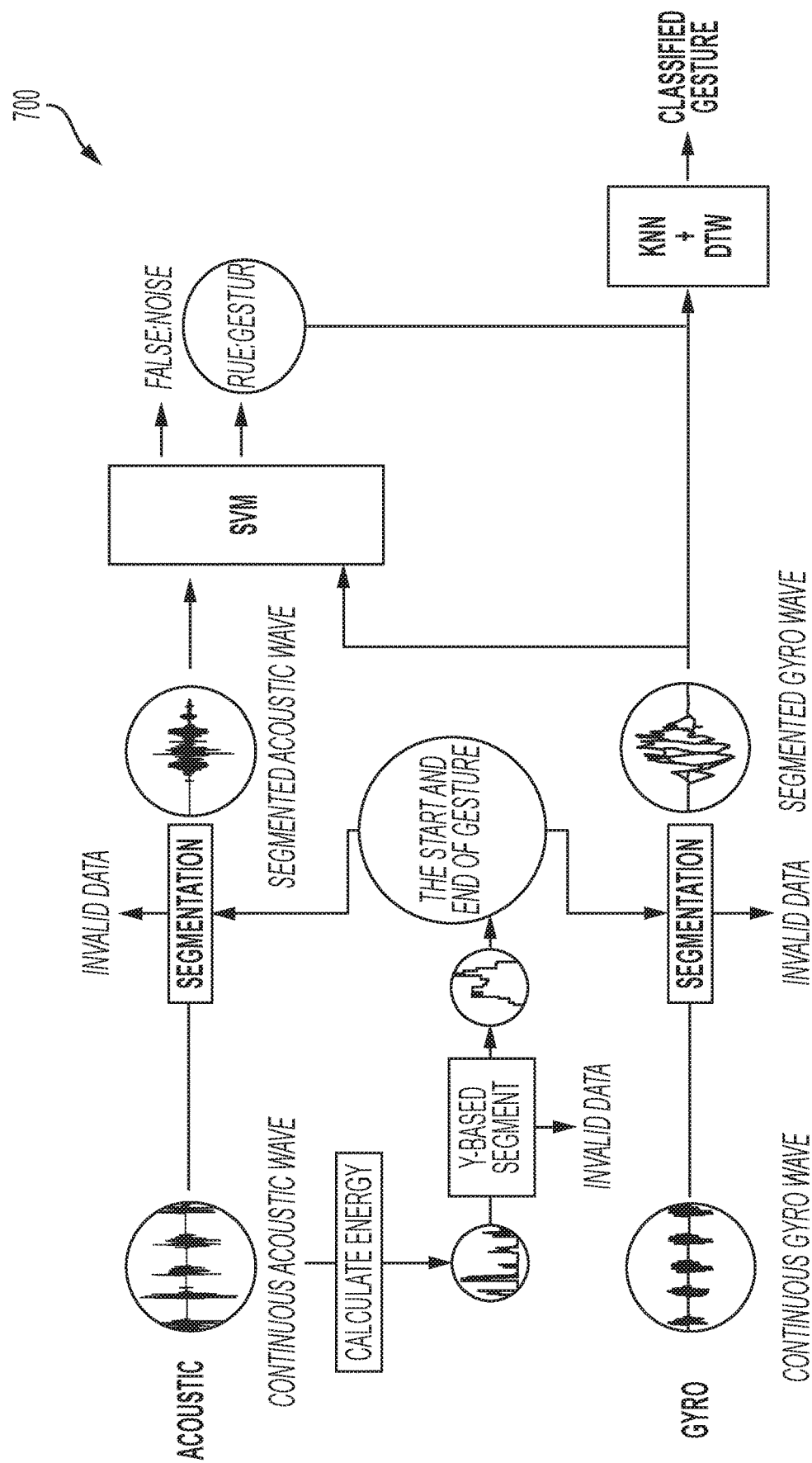
FIG. 7 demonstrates a flow of data processing associated with a wearable device, in accordance with one or more embodiments of the present disclosure.

FIG. 7 demonstrates a flow of data processing associated with a wearable device. The flow of data processing allows the wearable device 205 to capture and analyze data in real-time. The wearable device 205 may include may a receiver 215 and a sensor 210. The receiver 215 and the sensor 210 may send data to a remote device over USB ports separately. A program associated with the remote device reads inputs associated with the receiver 215 and the sensor 210 simultaneously and stores both in a readily accessible data structure. On another parallel thread, the input sound stream is continuously analyzed to detect an input gesture activity. This may be performed using an energy-based sliding window segmentation algorithm. To detect the start and end of a gesture, the sound produced by the grazing of the thumb on the fingers or palm is analyzed. The analysis may be based on the short-term energy representation of the sound data (e.g., microphone signal). The energy is calculated as the square root of the sum of the Euclidean norm of the sound data over a short analysis window (frame). The analysis window is 4, 410 samples (0.1 s) long and shifted along the raw sensor data. The resulting energy signal is the basis for detecting onset and offset of relevant thumb gestures. For gesture segmentation, (i.e., determination of start and end points of relevant thumb gestures within the continuous stream of sensor data, a two-stage filtering approach is employed. First, using another sliding window procedure analysis windows are extracted covering two consecutive seconds of sound (energy) data. Empirical studies show that relevant thumb gestures typically last no longer than two second, which determined the window length. In an intermediate processing step, windows below a certain sound data is below a certain noise threshold are eliminated. Second, within every extracted two-second window potential start and end points of thumb gestures are searched. A start point is characterized as being the first one within the two second window that lies on a positive flank, i.e., when the signal energy increases from zero to positive values. Conversely, an end point is determined as the last one within a two second window that is on a negative flank (from positive values to zero). The offset and onset detection procedure provides effective segmentation of potential gestures. Further, if the length of an extracted gesture exceeds a preset threshold of minimum gesture length, it is determined to be a genuine input. The extracted start and end points of such gestures are then used as index points for segmenting the actual sound (not energy) and gyroscope data from the continuous data stream and to pass this data to the subsequent stage in the data processing pipeline, i.e., feature extraction and classification.

Responsive to the algorithm detecting a possible input, the sound data and corresponding motion data are segmented and saved for further processing. While the motion data is segmented, the segment is extended in both directions to acquire additional motion data as a buffer. The segmented sound and motion data is passed through a support-vector machine (SVM) classifier to detect if the data represents a genuine gesture or noise. The acoustic energy-based gesture detection scheme is likely to over-segment the underlying signal, i.e. produce false positive predictions. At this stage of the processing pipeline, false positive predictions occur because only relatively genera analysis rules have been applied analyzing the sound data coarsely. Up to this point no actual classification has been performed. Next, false positive gesture predictions are eliminated by applying a binary SVM classifier for every extracted segment. The classifier effectively filters out one or more portions of data that do not correspond to the one or more gestures, but rather to noise. It should be noted that the classifier does not operate on raw signals but rather on their feature representation. The sequential minimal optimization (SMO) implementation of SVM provided by Weka is used.

Both motion and sound data are used to calculate meaningful features. For example, for each axis of motion data, a virtual sensor is extracted by calculating the derivative of each axis data. For each axis of the raw sensor and its derived virtual sensor, a set of statistical features including min, max, standard deviation, zero-crossing rate, root-mean-square (RMS), the values of peaks and the differences between the peaks are extracted. The following are calculated, values of the first and second peaks, the ratio and differences of the energy peaks, and correlation between different axes on raw gyro (motion) and derived virtual sensor. For sound data, a set of common features in the frequency domain, including 26 Mel-frequency cepstral coefficients (MFCC) and the lower 30 bins of the Fast Fourier Transform (FFT) are extracted. The aforementioned features may be the most informative of the frequency ranges. Connecting the features extracted from the sensor (gyroscope) and the sound data together, provides a vector with 154 components used to train a SVM to classify noise vs. gesture.

Responsive to the SVM classifier recognizing a gesture, the motion data is sent through a low-pass-filter and finally to a classifier which recognizes the input gesture pattern. The gesture recognition algorithm may occur as the final stage of the data processing pipeline. Every extracted segment previously classified as a gesture is now analyzed by a dedicated recognizer, which classifies the type of gestures. The recognition technique is performed in real-time and/or near real-time. Dynamic Time Warping (DTW) may be employed. DTW is essentially an implementation of dynamic programming where two temporal patterns are compared using specific edit distances. DTW quantifies the dissimilarity between two sequential input patterns by finding the minimal set of operations—insert, delete, match, substitute—that map one sequence to the other thereby using cost factors for every single operation. Through minimizing the overall edit costs the procedure finds the optimal alignment and quantifies the error. The advantage of DTW based analysis is that it accounts for input patterns of different lengths and is very efficient. Combining DTW based sequence matching with a standard k-NN classifier (k=3) for classification. This procedure provides effective and efficient template matching. The template database may include representative examples of all relevant thumb gestures. The implementation of DTW may be provided by Java machine learning library.

Figure 8A:
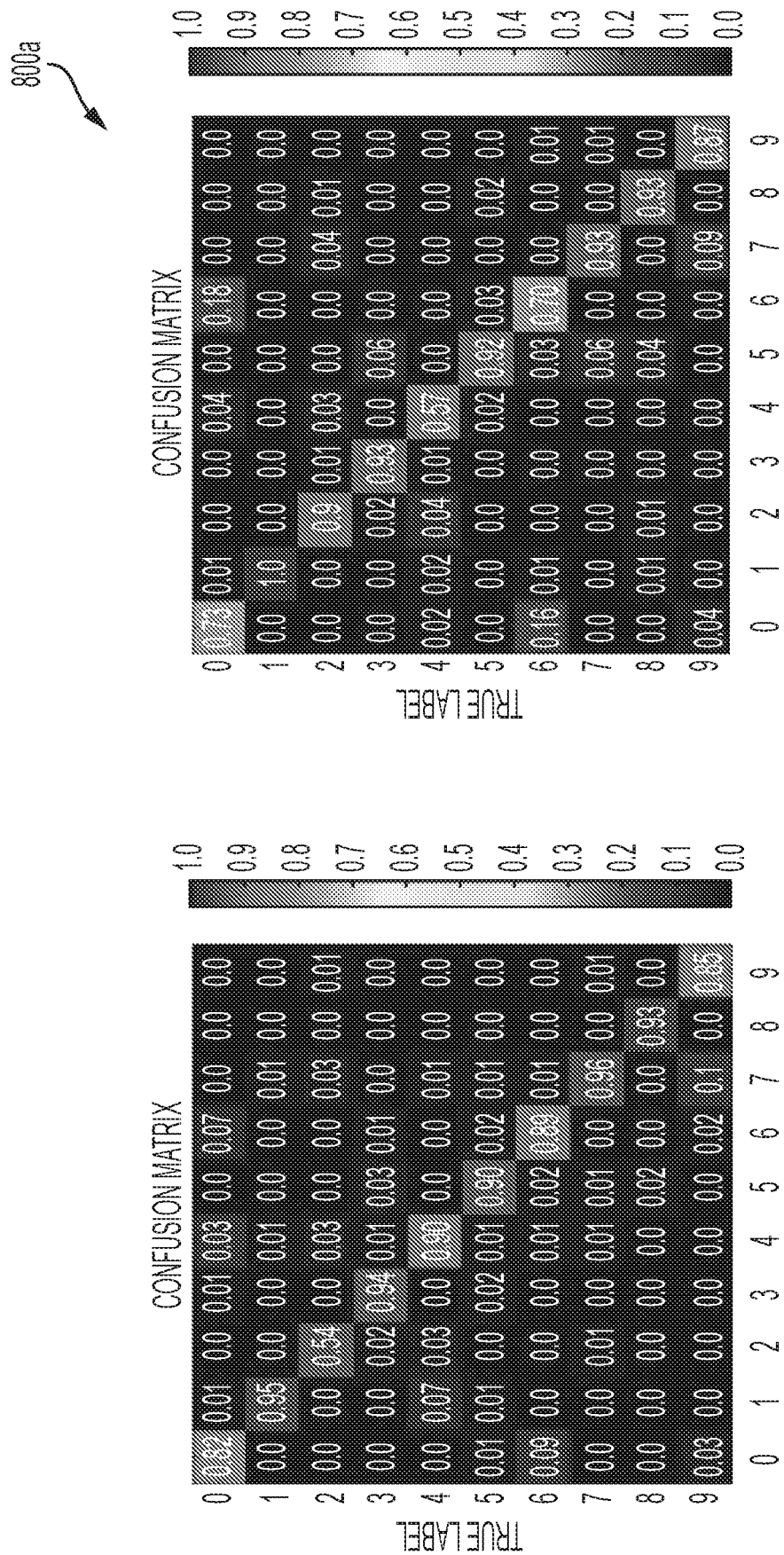
FIG. 8A-B show a confusion matrix for 10 digits of a user of a wearable device, in accordance with one or more embodiments of the present disclosure.
Figure 8B:
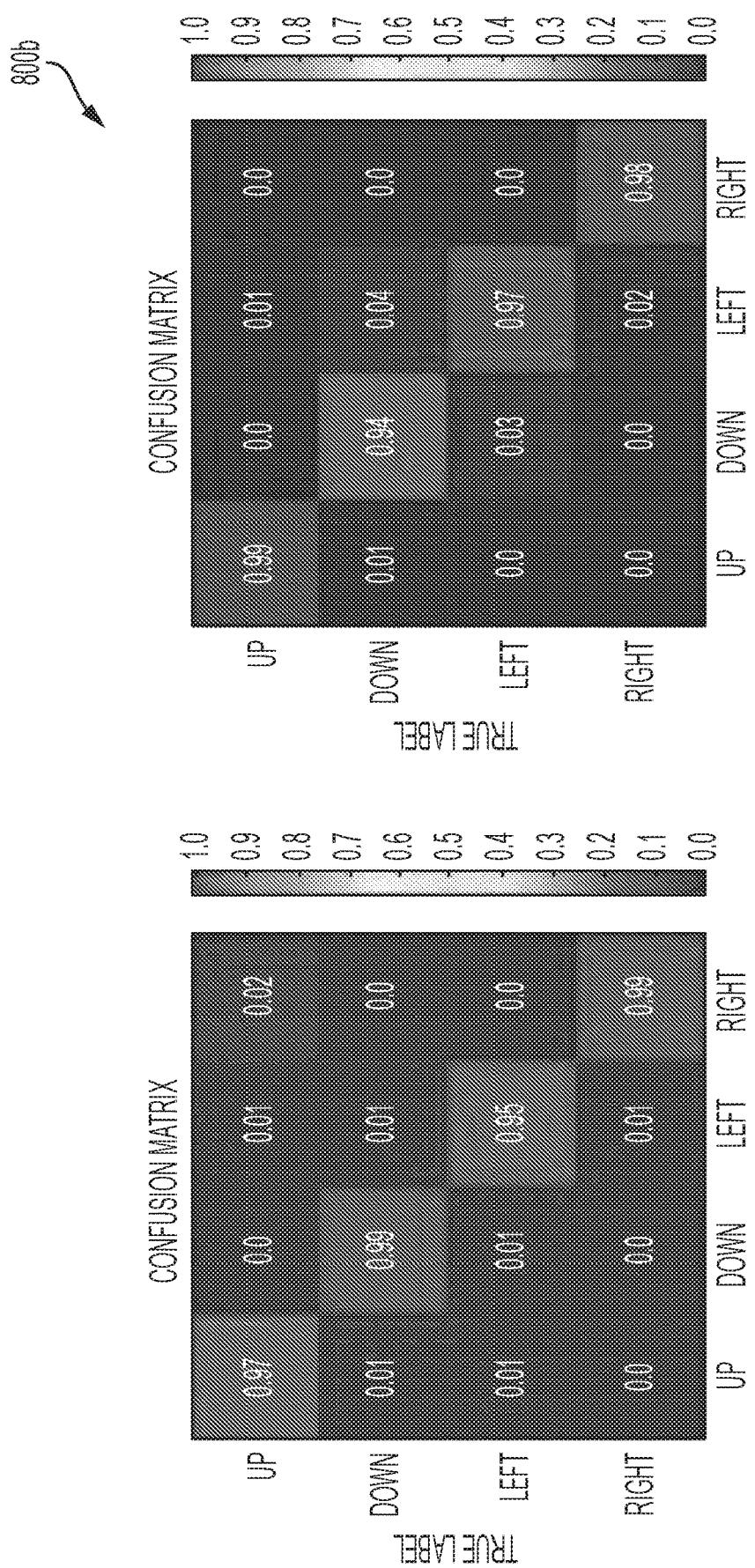

FIG. 8A-B show a confusion matrix for 10 digits of a user of a wearable device. In FIG. 8A, a confusion matrix for 10 digits of a user's hand are shown. Chart "a" shows the first sessions where the participants' hands were on the table. Chart "b" shows the last two sessions where the gestures were performed under the table in an eyes-free fashion. In FIG. 8B, a confusion matrix for 4 directional slides is shown. Chart "a" shows the first 4 sessions where participants' hands were on the table. Chart "b" shows the last 2 sessions where the gestures were performed under the table in an eyes-free fashion.

To demonstrate the capability of recognizing unistroke thumb gestures and evaluate the interaction experience of the wearable device 205, a user study with nine participants with an average age of 26 (3 male) on two sets of unistroke gestures—the digits 0-9 and directional swipes under two settings. All participants were recruited from a university campus. The study was conducted in a lab-based environment. Each user study lasted about one hour. Before the study, two researchers provided about 100 gestures and 100 noise samples as the basic training data for building the SVM noise classifier. At the beginning of the study, one researcher helped the participant to put on the wearable device 205 and demonstrated how to perform each gesture. The participant was allowed to practice each gesture until she felt comfortable to proceed to the actual test. The actual study consisted of 2 training sessions and 6 testing sessions.

In the first two training sessions, the participants were asked to put hands and arms on the table. Each unistroke gesture was performed 3 times in a random sequence during each session. Visual stimuli on the screen and an audio cue were used to remind the participant of the gesture to be performed. The gesture segmentation pipeline is running continuously to detect and segment a gesture instance. If the system failed to detect a gesture, the participant was advised to repeat the gesture until successfully detected. The first session was treated as a practice session, which helped the participants get familiar with the unistroke gesture sets as well as our experimental real-time system. The second session was used as the training data collection session for building machine learning models of gesture segmentation (SVM) and gesture classification (KNN with DTW distance function). In total, 30 (3×10 gestures) and 12 (3×4 gestures) gesture samples were collected as the training data set for unistroke digit gesture and directional swipe gesture, respectively, for each participant. The collected gesture data was combined with pre-collected data from researchers to train the SVM-based noise classifier for each participant.

After the first two sessions, each participant was required to provide 30 test instances per gesture with their hand in two different locations. Within each session, each participant provided 5 instances per gesture in a random sequence. The gesture recognition results were presented to the participants in real-time on the screen. If the classification result matched the stimuli gesture, the background was marked in green. Otherwise, it turned to red. Furthermore, if the participant performed a gesture, but the system failed to detect it or labeled it as noise, the gesture was labeled as a false-negative error. To investigate whether the user can perform gestures in an eyes-free fashion and in a different hands posture, these 6 test sessions were divided into two groups. In the first 4 testing sessions, the participants placed hands on a table, similar to the training session. In total, 200 samples (5×10 gestures×4 sessions) for unistroke digits and 80 samples (5×4 gestures×4 sessions) for directional swipe were tested in these 4 testing sessions for each participant. In the last two sessions, the participants were required to hold the hands under the table to perform the gestures. These two sessions were designed to simulate the real-world scenarios where the user would likely perform gestures in an eyes-free fashion with various hand postures. In total, 100 samples (5×10 gestures×2 sessions) for unistroke digits and 40 samples (5×4 gestures×4 sessions) for directional swipe were tested in the last two sessions.

The average accuracies for the first four sessions and the last two sessions are 92% and 89% respectively for the 10 unistroke digits. On average, 2.58 false-negative errors were captured in each session. The most accurate gestures were the digits '1', '7' and '8', and the least accurate digits are '0', '6' and '4'. The '0' and '6' were the most mutually confusing gesture pair, because of their very similar gesture patterns.

The only difference is '6' ends a bit lower than '0'. Interestingly, '4' was misclassified with '1', while '1' received the highest precision. To perform a '1', it is easy to find that to draw '4' on the fingers, the participant can first drag the finger down first, which is the same as '1', and then turn the thumb to the right.

The average accuracies for the four directional swipes are high in general, 98.19% and 96.94% in the first four sessions and the last two sessions (eyes-free), respectively. Only 'down' and 'left' caused a few confusions when the hands were held below the table. On average, 2.74 false-negative errors were observed in each session.

The current results indicate that the accuracies were slightly lower when participants performed the gestures under the table. There are two factors that influence this accuracy. The first factor is that the decreased accuracies were caused by the lack of visual observation of the hands while performing the gestures in the last two sessions. However, all participants started performing the gestures without looking at their hands once they mastered the gesture, even in the first four sessions based on our observation. Another hypothesis is that the training data was collected while the hands were placed on the table. However, when the hand was held below the table, the posture of hands were different, which may influence how a gesture was performed.

Figure 9:
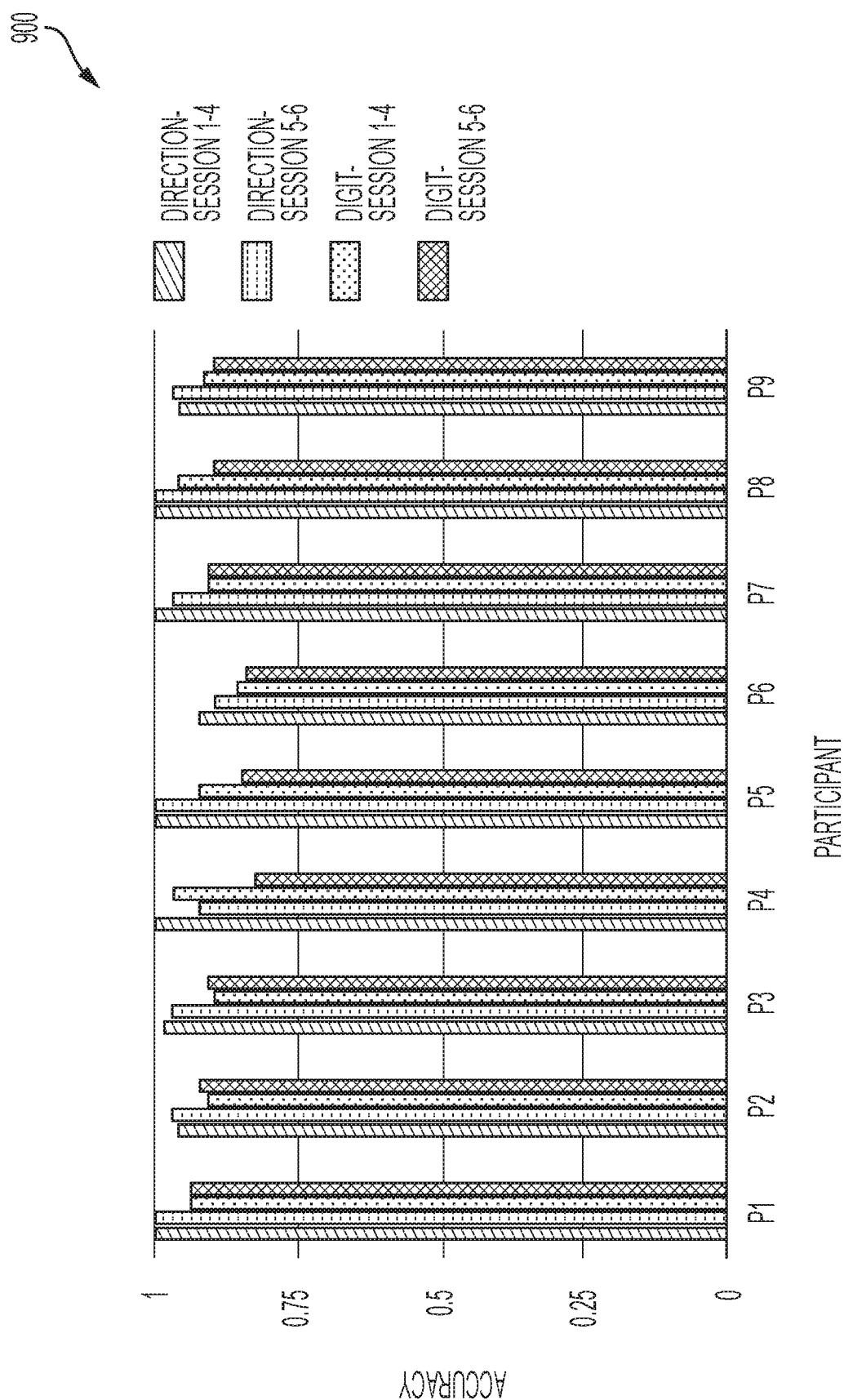
FIG. 9 is a graph illustrating the accuracy for gesture determination each of a plurality of users of a wearable device, in accordance with one or more embodiments of the present disclosure.

FIG. 9 is a graph illustrating the accuracy for gesture determination each of a plurality of users of a wearable device. As shown in FIGS. 9, P1 and P8 show the highest accuracies from amongst a plurality of users of the wearable device 205. P6 shows the lowest accuracy from amongst the plurality of users of the wearable device 205. The accuracies for most of the plurality of users decreased in the eye-free evaluation, except for P1. It appears that P1 performed the gestures consistently across all sessions.

Figure 10:
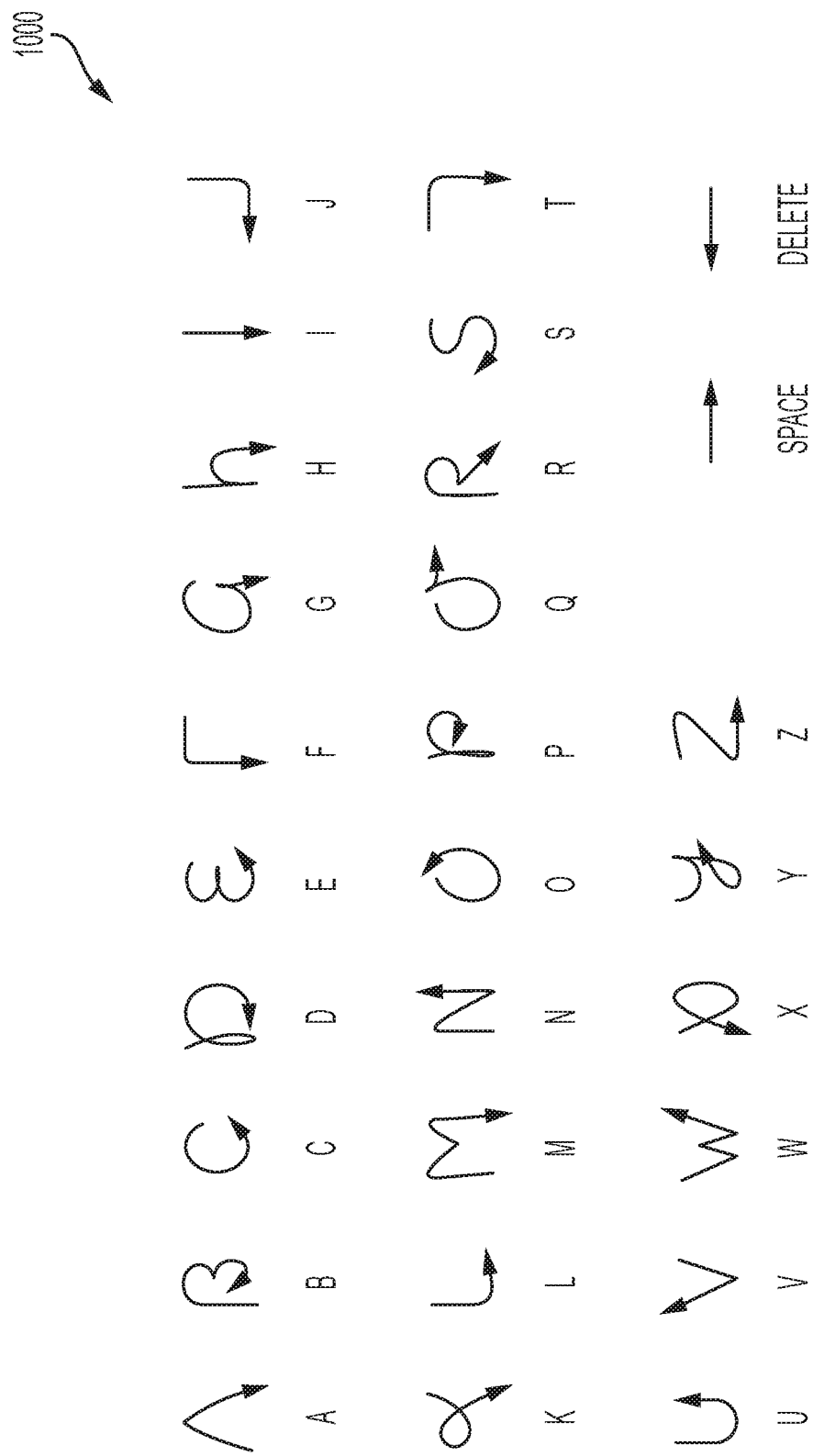
FIG. 10 is a chart illustrating a plurality of gestures associated with a wearable device, in accordance with one or more embodiments of the present disclosure.

FIG. 10 is a chart illustrating a plurality of gestures associated with a wearable device. As shown in FIG. 10, 28 unistroke gestures including 26 Graffiti-style letters may be associated with the wearable device 205. Graffiti is a gesture set that was created by Palm, Inc. to provide text input on PDA. Each Graffiti gesture resembles the uppercase form of the English alphabet, such that it is easy to learn and use. A previous study shows that a plurality of users of the wearable device 205 can achieve an accuracy of 97% after five minutes of practice. The presently disclosed system is able to recognize the Graffiti gestures and therefore, demonstrate the ability recognize a rich set of unistroke gestures. Further, the results illustrate the possibility of using this technique as an alternative text input method for short messages in future embodiments.

Figure 11:
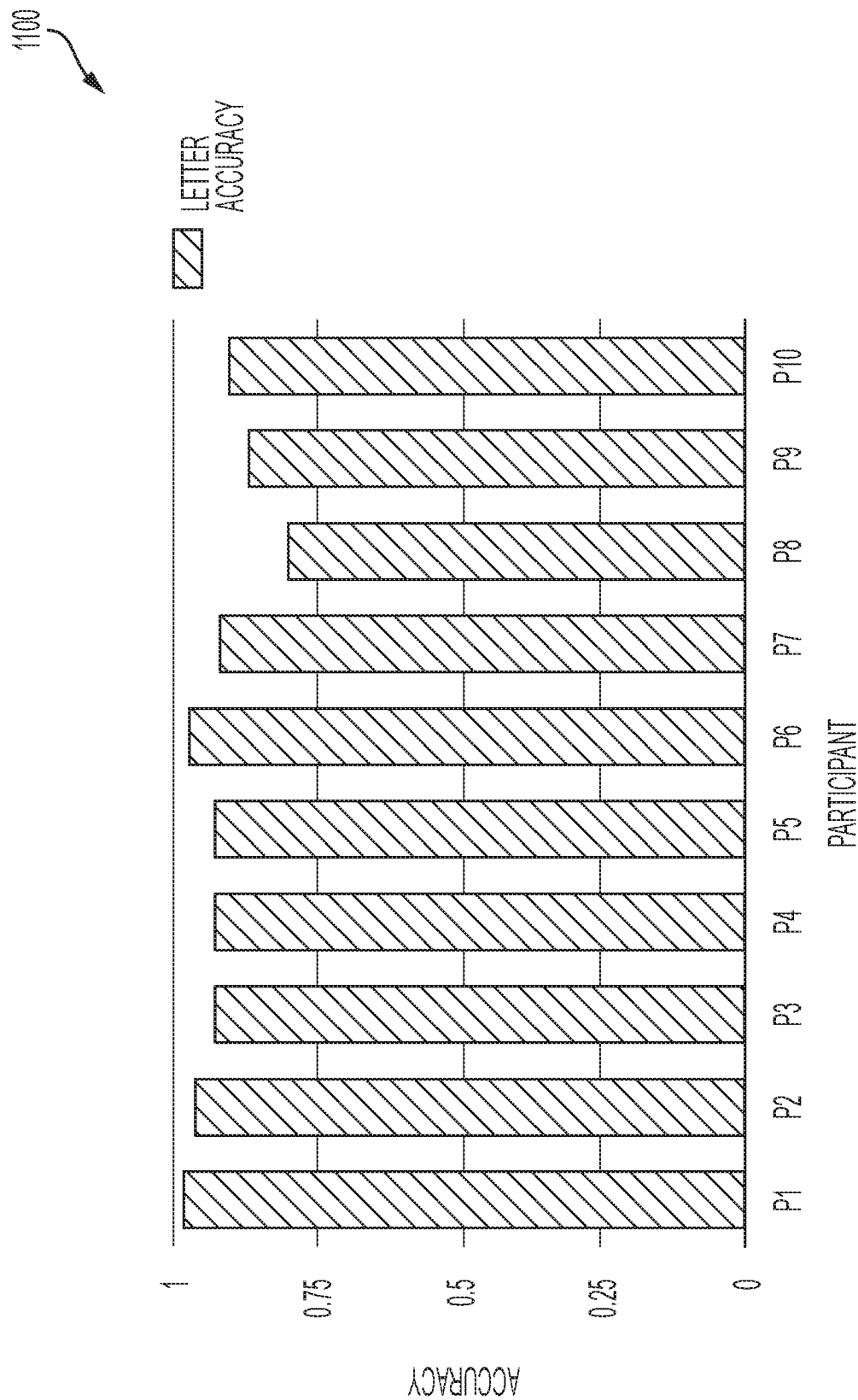
FIG. 11 is a chart illustrating the accuracy for each of a plurality of users of a wearable device on Graffiti input, in accordance with one or more embodiments of the present disclosure.

FIG. 11 is a chart illustrating the accuracy for each of a plurality of users of a wearable device on Graffiti input. In the corresponding study, the number of testing sessions were reduced (given a large number of samples), but one more practice session was added as compared with the previous user study, to give the users more time to learn the larger gesture set. Overall, there were 5 sessions in this study. The first two sessions were practice sessions (3 samples per gesture per session), the third session (3 samples per gesture per session) is the training data collection session and the last two sessions (5 samples per gesture per session, hands on table only) were the testing sessions. As before, the real-time classification result was presented to the participant and recorded. In total, 10 participants (including four researchers, 2 female) with an average age of 27 participated in this study. None of participants were involved in the first study. All sessions were completed in one hour. The real-time classification results for recognizing the 28 unistroke gestures resulted in an average accuracy of 92.46%. There were 5.9 false-negative errors observed on average for each session.

Figure 12:
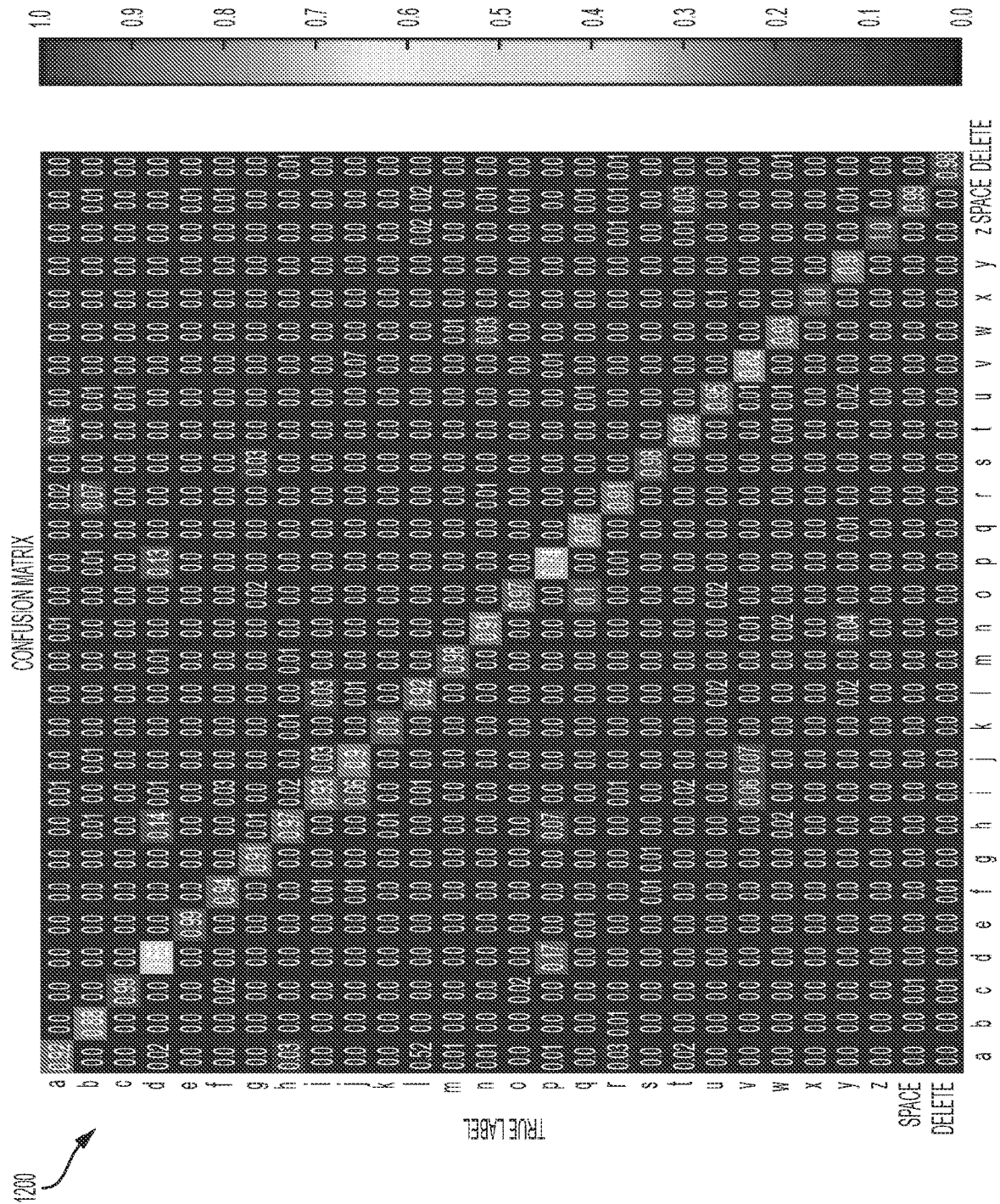
FIG. 12 is a chart illustrating a confusion matrix for Graffiti unistroke gestures, in accordance with one or more embodiments of the present disclosure.

FIG. 12 is a chart illustrating a confusion matrix for Graffiti unistroke gestures. The most accurate gestures are the letter 'X' and 'Z' whose precision are 100%. The least accurate gestures are the letter 'D' and 'P' with the precision of 69% and 74%. The reason for confusion between these two letters is visually apparent as they look very similar. The only difference between them is where the gesture ends. The 'D' ends at a lower position than where 'P' ends, which appears harder to be distinguishable by intuition compared to other letters.

The accuracy for each participant is presented in FIG. 11. P1 and P8 provide the highest accuracy of 98.93% and the lowest accuracy of 80.36%, respectively. It is surmised that P8 did not develop a consistent pattern during the practice and training sessions. As a result, every time a gesture was misclassified, P8 tended to adjust the way that gesture was performed, which lead to more false-positive errors in the end. This indicates that certain users may demand a longer time to master the thumb gestures, or a reinforcement learning methods may be advantageous.

Figure 13:
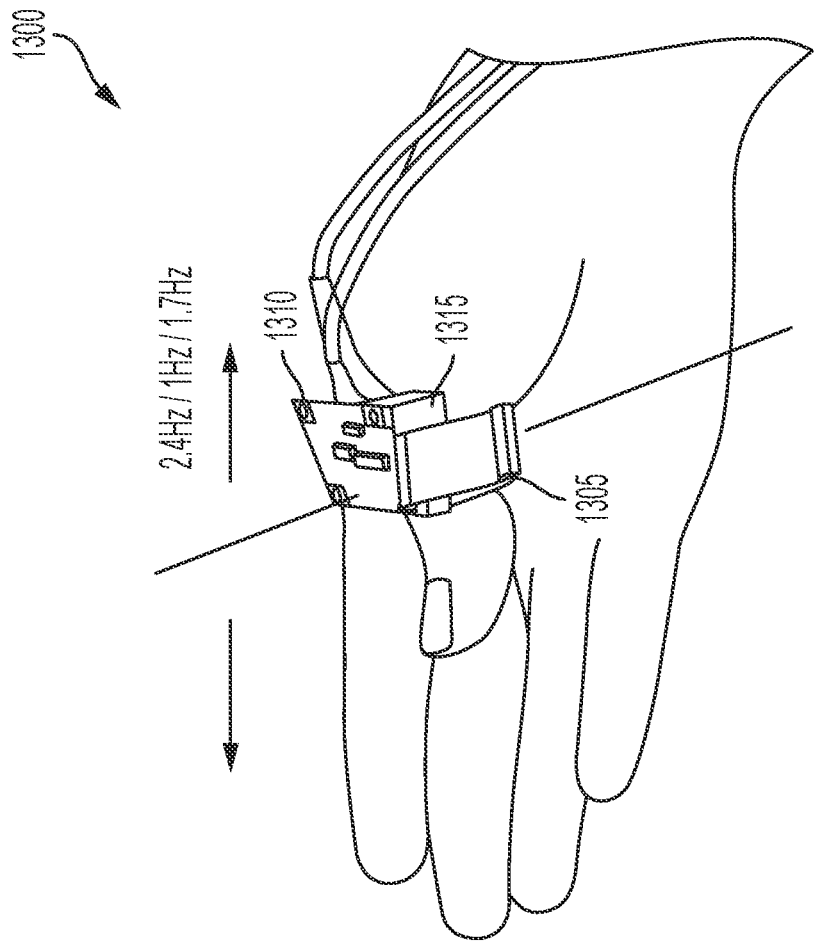
FIG. 13 illustrates a wearable device for providing extended user input, in accordance with one or more embodiments of the present disclosure.
Figure 13:
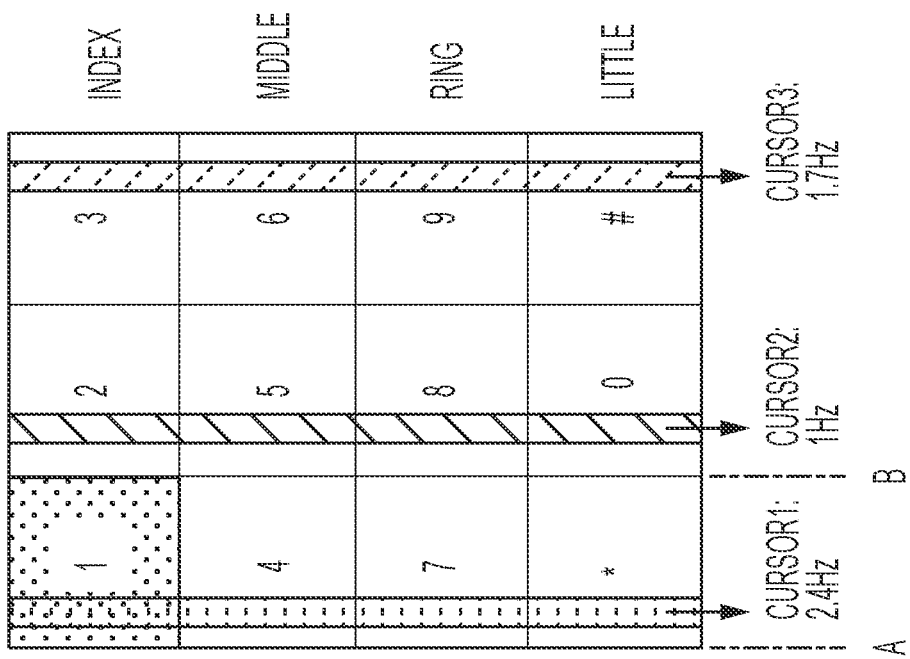

FIG. 13 illustrates a wearable device for providing extended user input. The wearable device 1305 may comprise a thumb-mounted ring with an inertial measurement unit 1310 (IMU) (e.g., motion sensor) and a contact microphone 1315 (e.g., receiver), connected to a Teensy 3.2 board and a pre-amplifier, respectively. In some embodiments, a USB audio board is used to connect the sensing platform to a laptop via USB. In an example embodiment, all data processing is performed on a remote device (e.g., wired laptop). Future embodiments may include more autonomous operation as well as more comfortable to wear hardware, i.e., a processor included with the thumb-mounted ring. The recording rate of the microphone was set to 44.1 kHz whereas the IMU sampled at 200 Hz.

Based on the thumb movements of a user wearing the wearable device 1305 while rubbing against other fingers, spectral movements are extracted and fed into a classification backend that facilitates gesture discrimination. The gestures are determined based on a visual interface that is a standard number pad including the digits from 0-9 and "*" and "#". Each row starting from row 1 (topmost) to row 4 (bottommost) is mapped to the index, middle, ring, and little finger, respectively. Each column has a horizontally moving cursor which moves within the bounds of its column. The moving cursor frequencies are 2.4 Hz, 1.0 Hz, and 1.7 Hz (from left to right). For instance, the leftmost cursor moves with a frequency of 2.4 Hz in the first column between points A and B repeatedly as shown in FIG. 13. During testing, the gesture to be performed is marked by a highlighted cell. For instance, (FIG. 13) depicts cell 1 (row 1, col 1) as highlighted. The study participant is expected to rub the against index finger (row 1) at a frequency of 2.4 Hz matching the cursor frequency in column 1.

Figure 14:
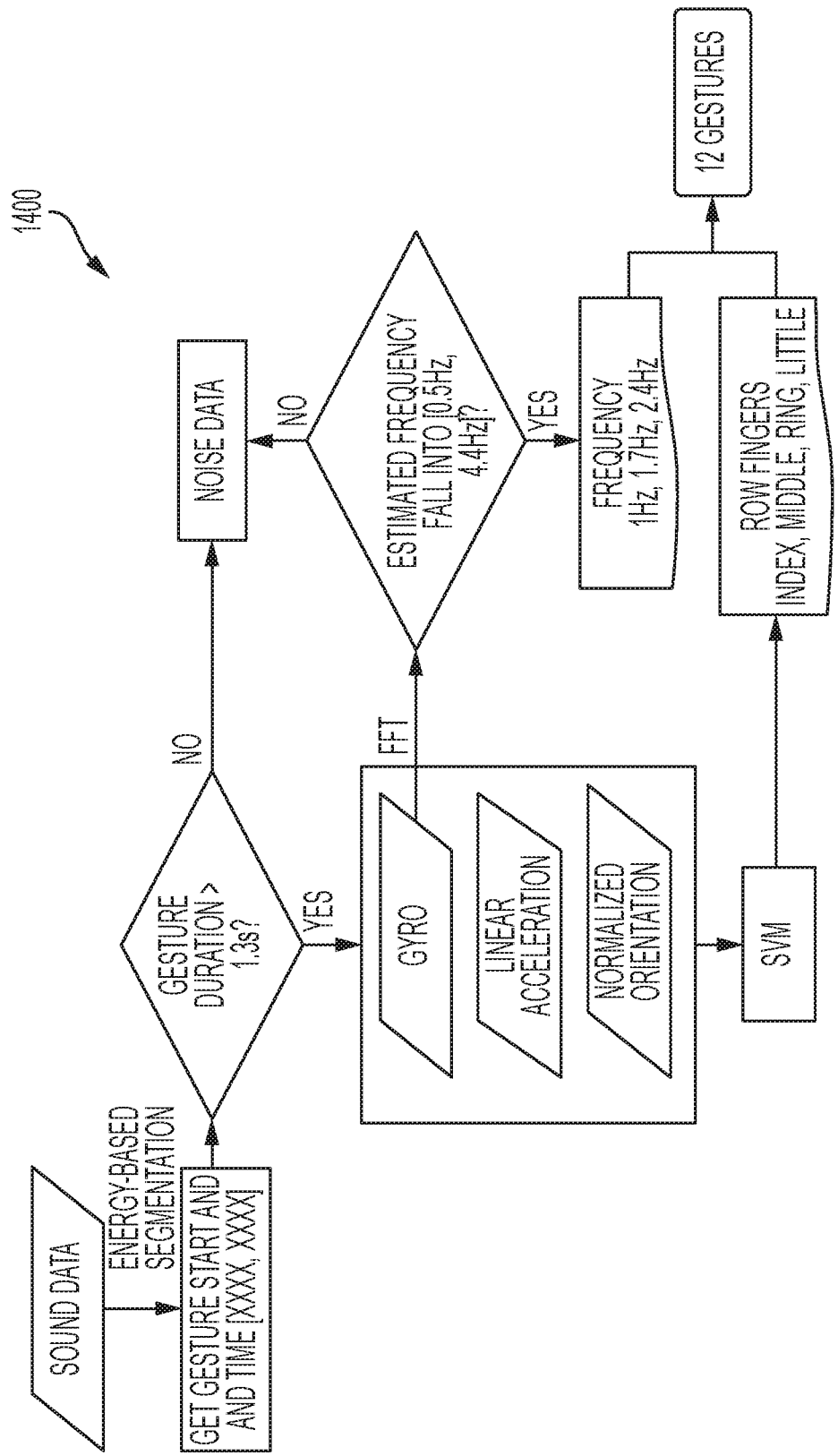
FIG. 14 demonstrates a flow of data processing associated with a wearable device, in accordance with one or more embodiments of the present disclosure.

FIG. 14 demonstrates a flow of data processing associated with a wearable device. As shown FIG. 14 gives an overview of the data processing pipeline used with the wearable device 1305. To detect the start and end of an intended gesture, a 100 ms window with no overlap is slid on the received sound data. The invention, however, is not limited to 100 ms windows; rather, various embodiments can use windows of many different time lengths including time lengths below 100 ms and/or above 100 ms. For each sliding window, silent portions are masked by applying an empirically determined threshold. The average energy is calculated based on the audio signal for every frame extracted by the sliding window process. Once the maximum energy of a frame exceeds an empirically determined activation threshold, the frame is marked as the start of a gesture. If the maximum energy for any subsequent, five consecutive frames (i.e., for at least 0.5 seconds) falls below the threshold, the gesture ends.

In some embodiments, if a gesture segment is longer than 1.3 s, the dominant frequency (band) of the gyroscope data (i.e., the frequency with highest power in the whole frequency spectrogram) is examined. To estimate the frequency, first the axis of gyroscope data with highest energy is found and then the FFT is calculated for the data of this axis. If the estimated dominant falls in the range [0.5 Hz-4.4 Hz], the extracted segment is labeled as a gesture. Otherwise, the data is marked as noise. The range used was determined empirically with the prototype system. Once a gesture is confirmed, the following steps are used to estimate the frequency of the thumb movement and identify on which finger the thumb is moving. First, the dominant frequency of the gyroscope data is compared to a set of preset frequencies (1 Hz, 1.7 Hz, 2.4 Hz) to find the closest match. For instance, if the estimated dominant frequency is 1.2 Hz, it would suggest that the user is performing a gesture to match the frequency of 1 Hz. These preset frequencies are chosen based on the results of a formative preliminary study that aimed at identifying thumb moving frequencies that are both comfortable to perform by users and discriminative w.r.t. three different states (slow, medium, fast).

To recognize which finger the thumb is rubbing against, use gyroscope, linear acceleration, and orientation data from the IMU 1310. To remove the influence of body orientation on the orientation data, the raw orientation data is normalized by subtracting the mean value on each axis before further processing. For each sensor, statistical features are extracted for each axis: minimum, maximum, mean, energy, variance, standard deviation, zero crossing rate, and entropy. To represent the relationship between axes, the Pearson-correlation and energy ratio are extracted between each pair of the three axes on each sensor. In total, 90-dimensional feature vectors are extracted (per extracted gesture segment) and fed into a support vector machine classification back-end to determine the finger on which the gesture was performed.

Figure 15:
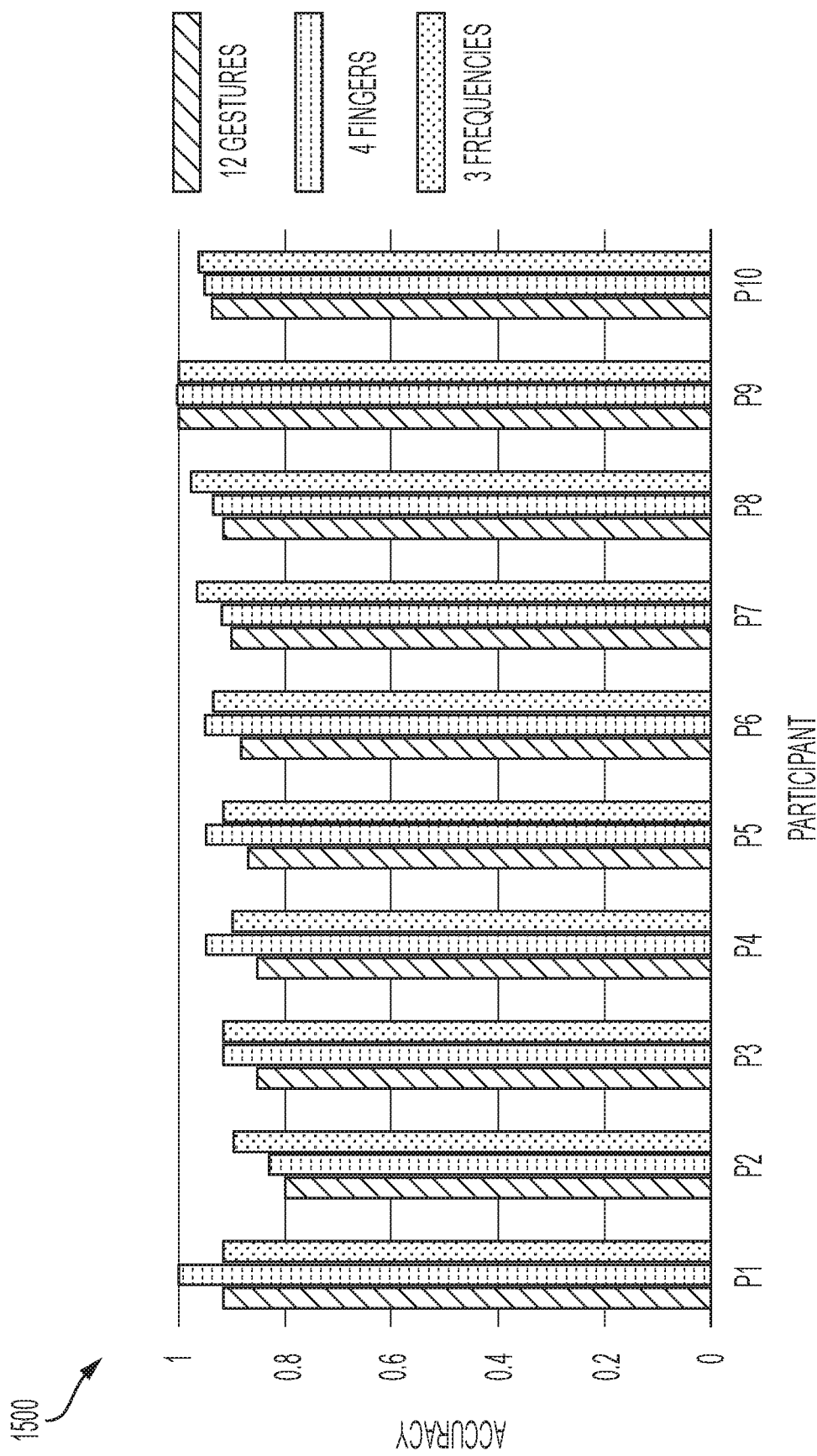
FIG. 15 is a graph illustrating the accuracy for gesture determination each of a plurality of users of a wearable device, in accordance with one or more embodiments of the present disclosure.

FIG. 15 is a graph illustrating the accuracy for gesture determination each of a plurality of users of a wearable device. The graph shown in FIG. 15 is in accordance with the following study. The study involved ten participants (five males, average age: 27.8±2.39, seven novices, three experienced users) to use the system and to perform thumb gestures. The general task was to match frequencies of movement patterns that were displayed on the remote device (e.g., laptop screen) through rubbing the instrumented thumb against one of the other fingers.

The study was performed in a controlled setting where participants faced a computer screen while resting their arms on the table. The system provided visual and auditory cues to assist the user with the study. During the study, randomly individual cells of the displayed grid were highlighted. Participants then had to match their thumb's rubbing frequency with the corresponding cursor frequency of the cell. Each participant finished three sessions—practice, training, and testing. Per practice session three repetitions of each gesture/cell were asked to be performed, whereas five iterations per gesture/cell were performed for both training and testing. The gesture to perform was selected randomly using a balanced distribution. Before the practice session started, a researcher explained the functionality of the system and demonstrated how to perform each of the plurality of gestures. Participants were guided to perform the rubbing gestures until they saw a match between the frequency of the thumb movement and the corresponding cursor. Gestures recorded during the training sessions were used for training the analysis system (classification back-end). In both the practice and training sessions, real-time feedback of the recognized column was provided to the user by highlighting the recognized column on the screen. The three experienced users skipped the practice session and only performed the last two sessions. Both the real-time classification results and the segmented raw sensor data were recorded for further analysis.

The overall accuracy across all ten participants is 89% for recognizing all 12 gestures, where P8 to P10 are the expert users. As can be seen, FIG. 15 presents the accuracy for each participant in different classification tasks. In the task of recognizing 12 gestures, P1 and P9 presents the highest accuracies of 91:7% and 100%, while P2 and P8 have the lowest accuracies of 80% and 91:5% across novice and expert users. Disaggregation of the recognition results gives insights into the performance of the two classification steps: i) which finger is the thumb rubbing against; and ii) which gesture (frequency) is the participant performing. On average, discriminating the four fingers the thumb rubs against works with 94% accuracy. The subsequent step of discriminating the three possible rubbing frequencies works with 94% accuracy.

Figure 16:
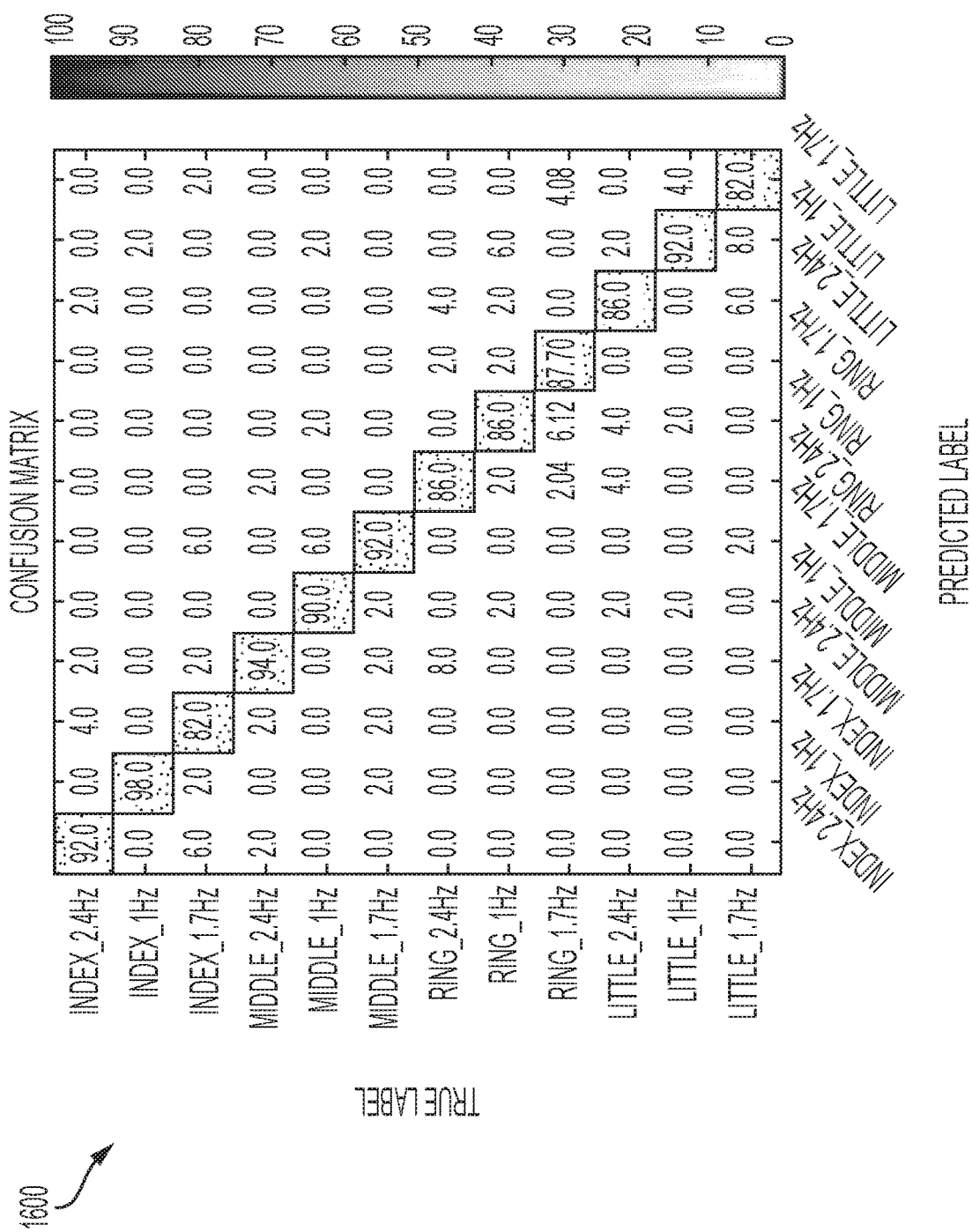
FIG. 16 shows a confusion matrix for recognizing a plurality of gestures associated with a wearable device, in accordance with one or more embodiments of the present disclosure.

FIG. 16 shows a confusion matrix for recognizing a plurality of gestures associated with a wearable device. The confusion matrix corresponds to the study of FIG. 15. As the confusion matrix illustrates, the gesture that has been recognized with lowest accuracy (82%) corresponds to rubbing the thumb against the index finger with the middle frequency (1.7 Hz).

Figures 17A, 17B:
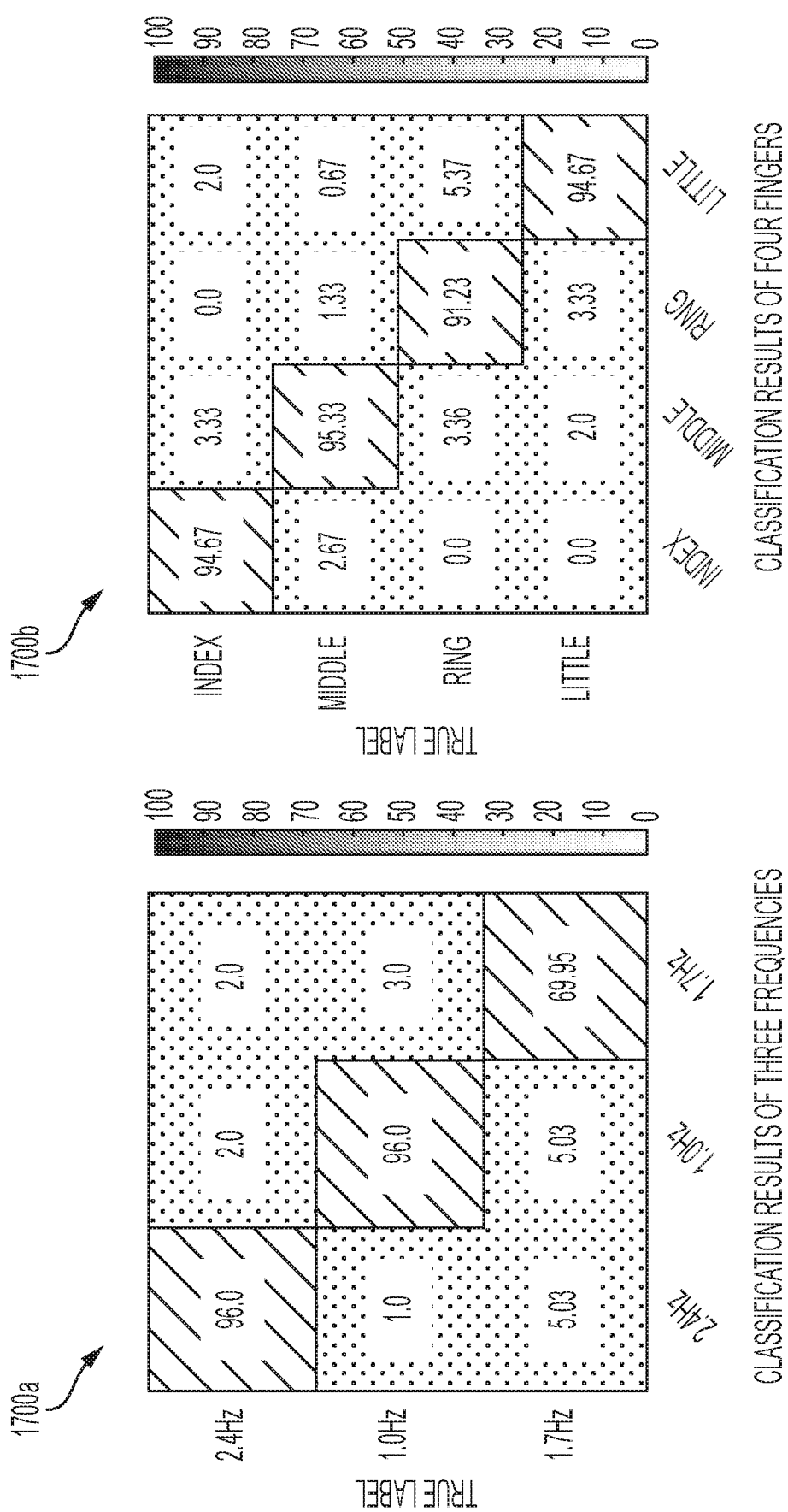
FIG. 17A-B show results for discriminating frequencies and fingers separately associated with gestures involving a wearable device, in accordance with one or more embodiments of the present disclosure.

FIG. 17A-B shows results for discriminating frequencies and fingers separately associated with gestures involving a wearable device. The lowest accuracy (89:95%) for classifying three frequencies across 4 fingers is 1.7 Hz as shown in FIG. 17A. The ring finger was the most confused finger as shown in FIG. 17B. In fact, most participants perceived rubbing their thumb against their ring and pinky fingers as rather uncomfortable, which explains the poor recognition performance and perhaps a greater variability of the performed gestures.

Figure 18:
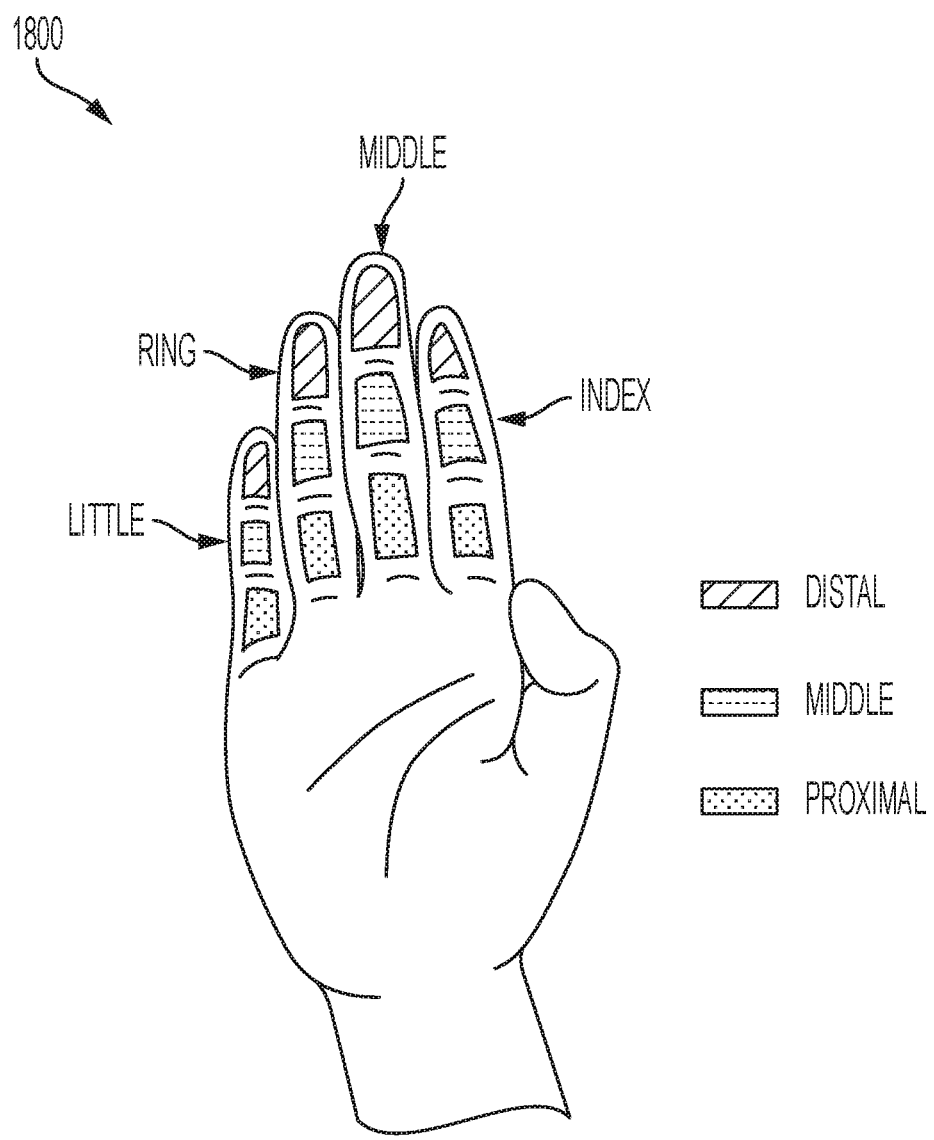
FIG. 18 illustrates contact with a plurality of phalanges as performed by a user of a wearable device, in accordance with one or more embodiments of the present disclosure.

FIG. 18 illustrates contact with a plurality of phalanges as performed by a user of a wearable device. The set of poses (e.g., contact with at least one of a plurality of phalanges) enables the user to input digits by touching any of the 12 phalanges of the index, middle, ring, and little fingers with the thumb. Because of the similarity between the layout of the 12 phalanges and a number-pad, this layout could be used to input digits or potentially input text using T9 keyboard without the heavy mental efforts to memorize different gestures.

Figure 19:
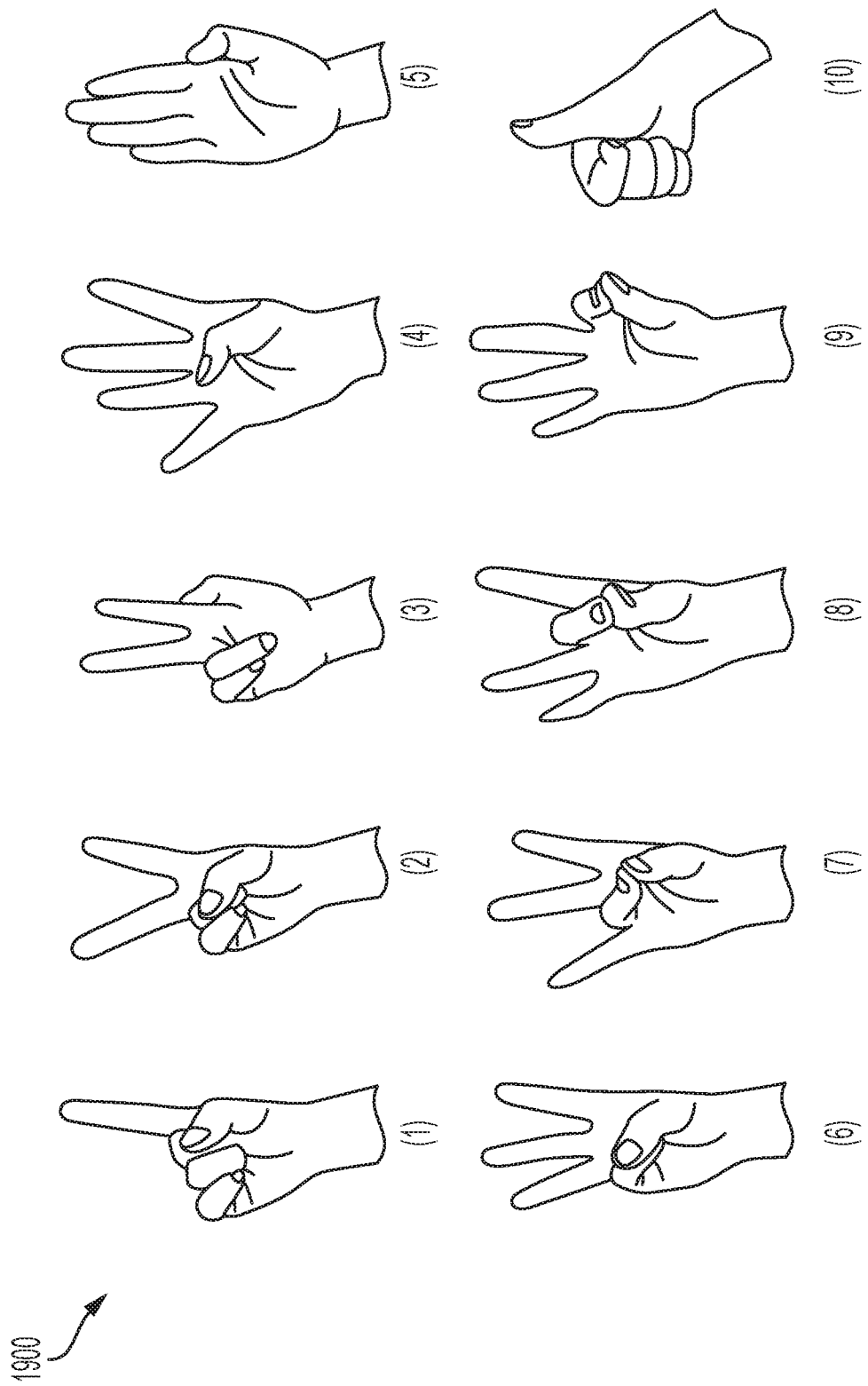
FIG. 19 shows a plurality of gestures from American Sign Language, in accordance with one or more embodiments of the present disclosure.

FIG. 19 shows a plurality of gestures from American Sign Language. The set of poses are the numbers '1' to '10' from American Sign Language. This set of poses is used to demonstrate the potential of an embodiments of the present disclosure at recognizing various poses of the hand. In addition, recognizing this set of hand poses can potentially be used to translate the digits expression from American Sign Language (ASL) for people who do not understand ASL. For instance, the recognized results can be played in audio to assist the communication. Furthermore, these poses can also be used as shortcuts to access different functions in wearable computers.

Figure 20:
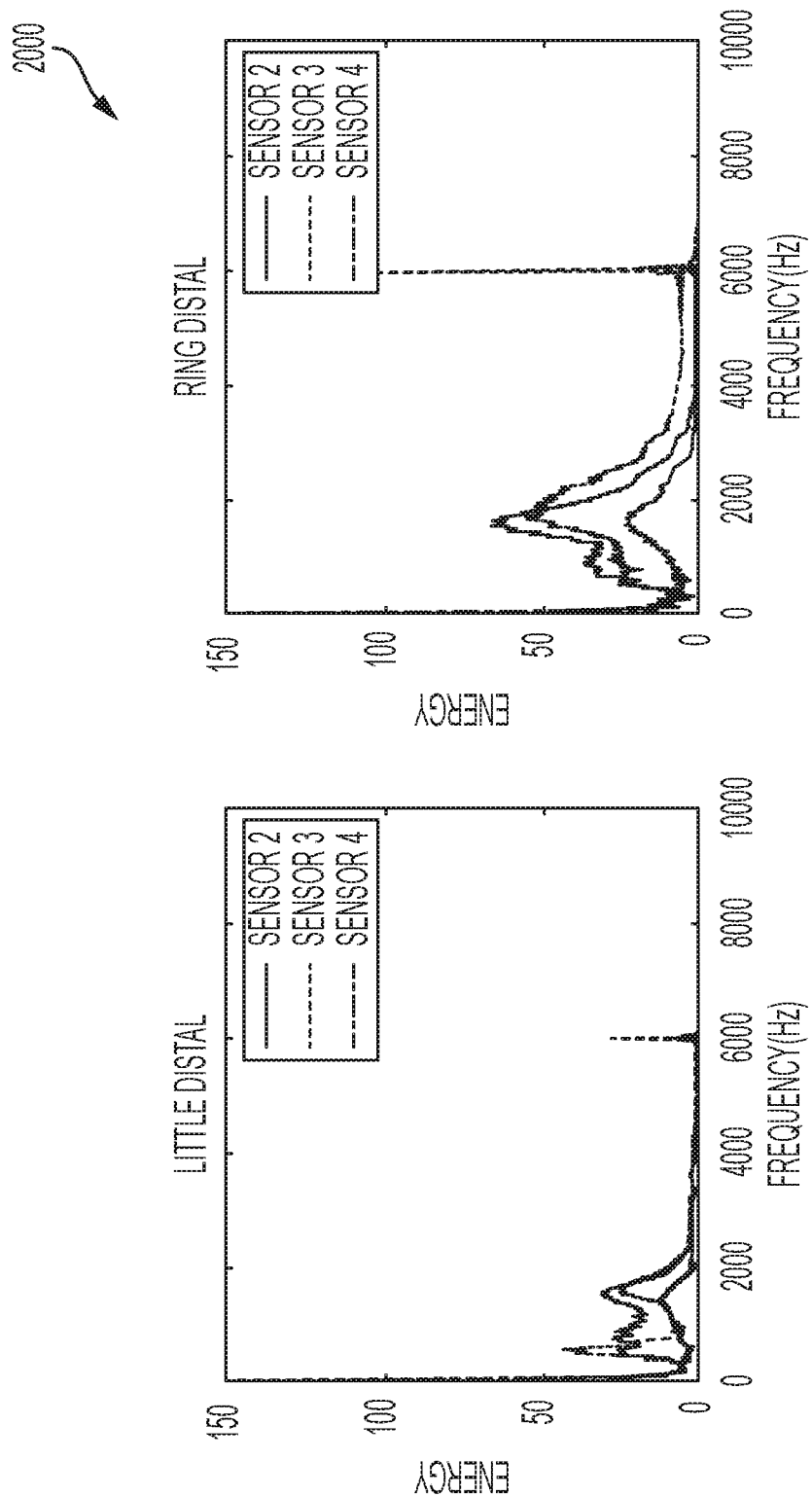
FIG. 20 shows a plurality of frequency responses to contact with each of a plurality of phalanges as performed by a user of a system for sensing and communicating data, in accordance with one or more embodiments of the present disclosure.
Figure 20:
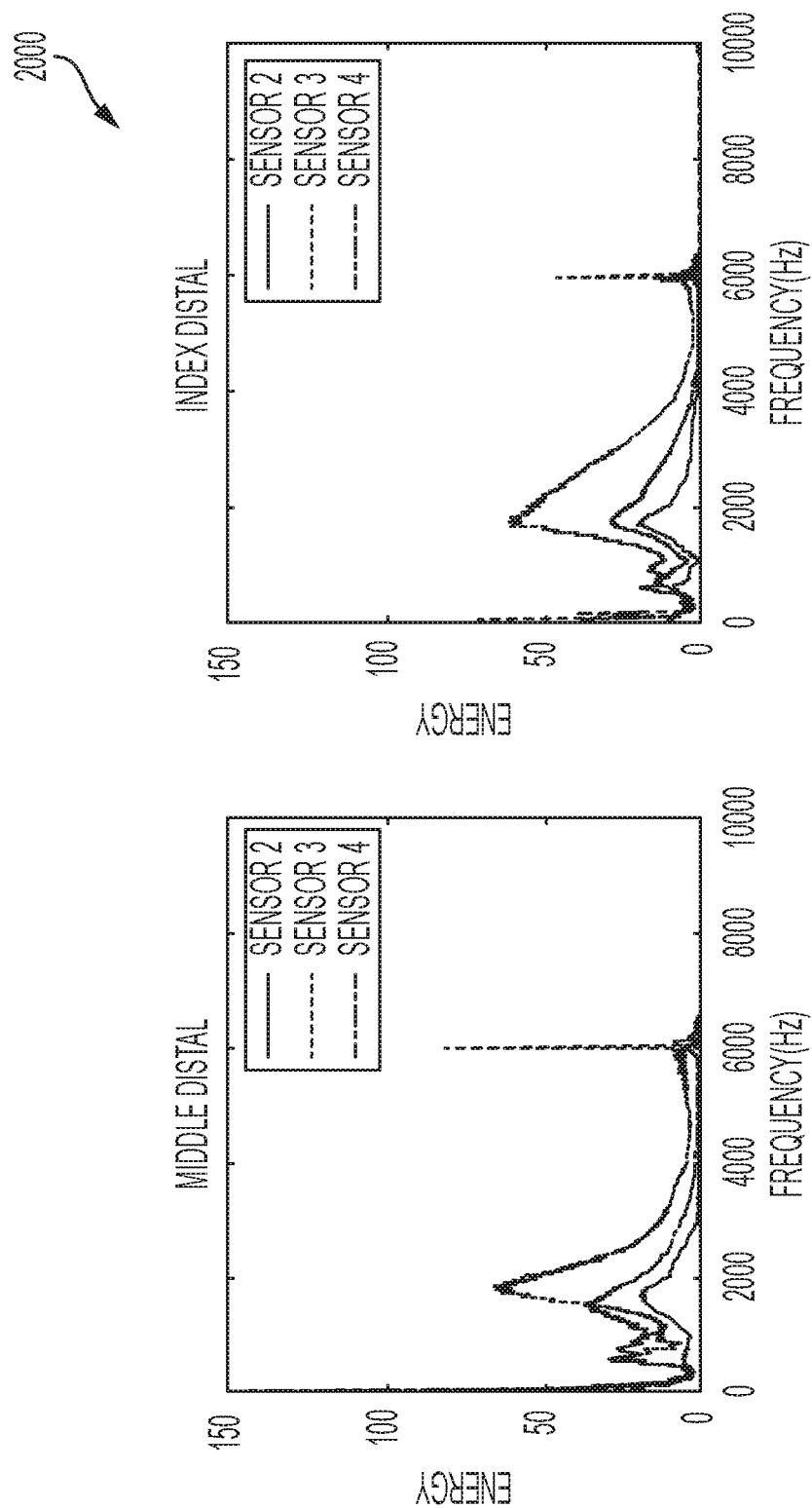
Figure 20:
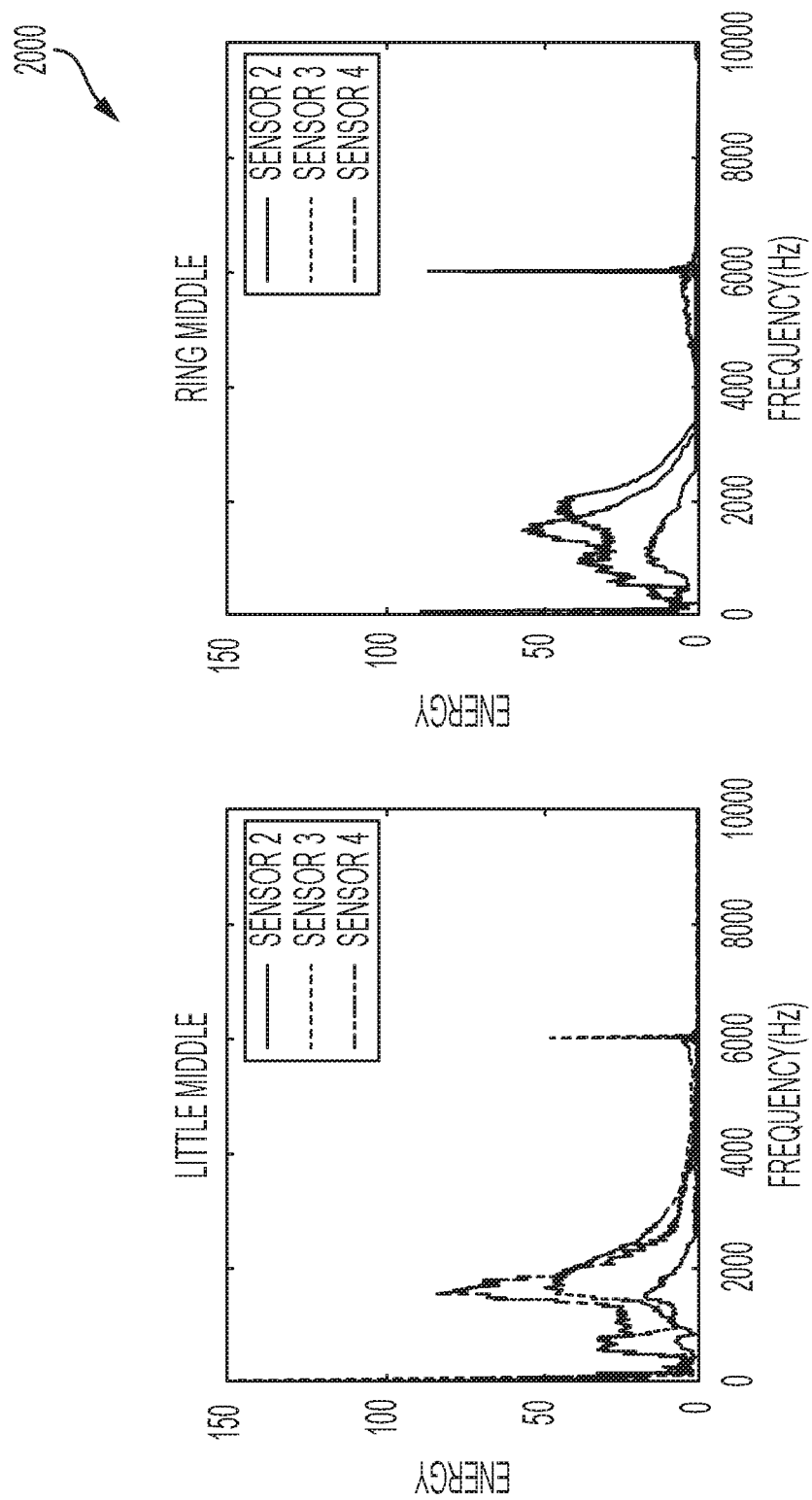
Figure 20:
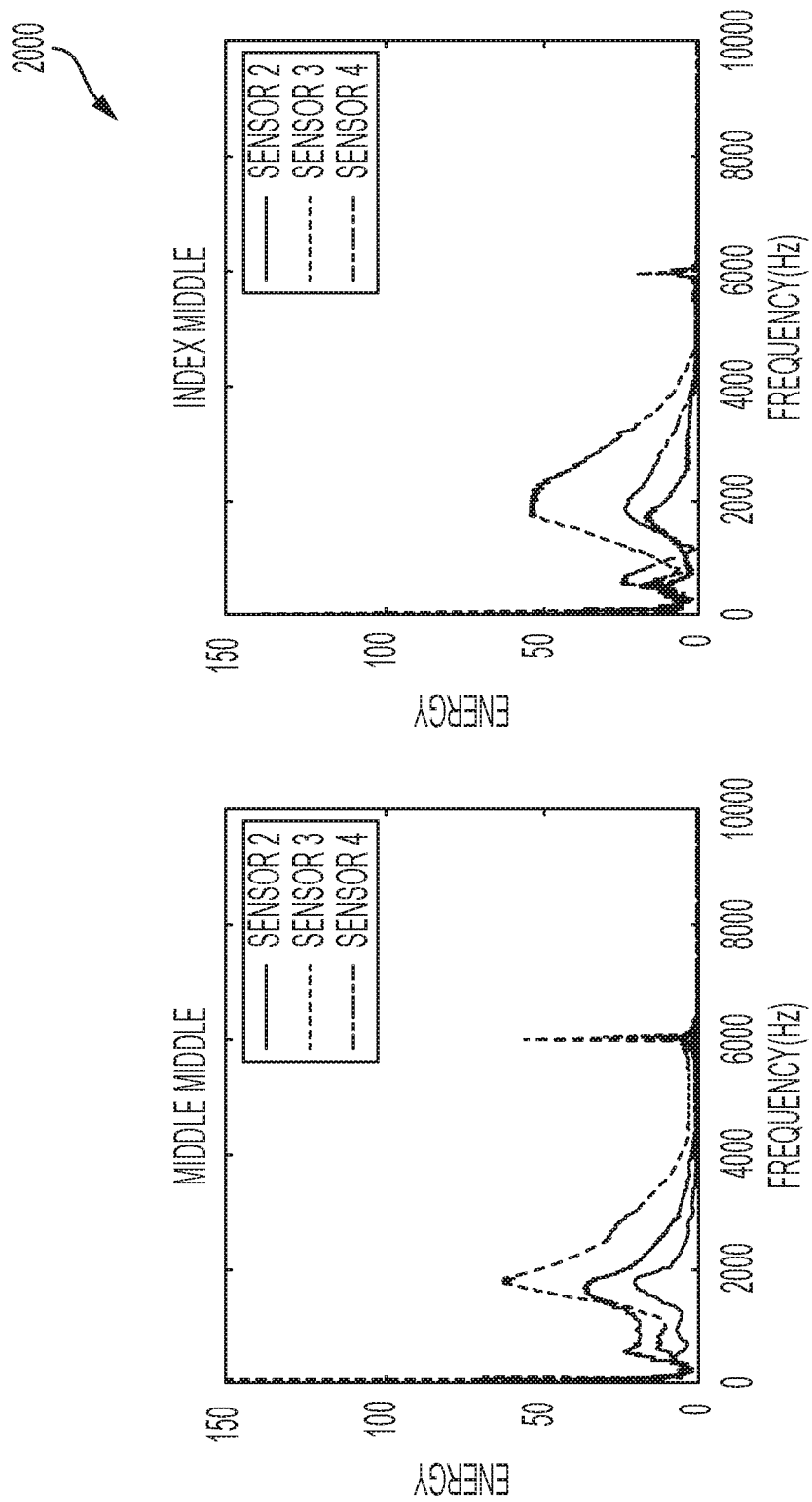
Figure 20:
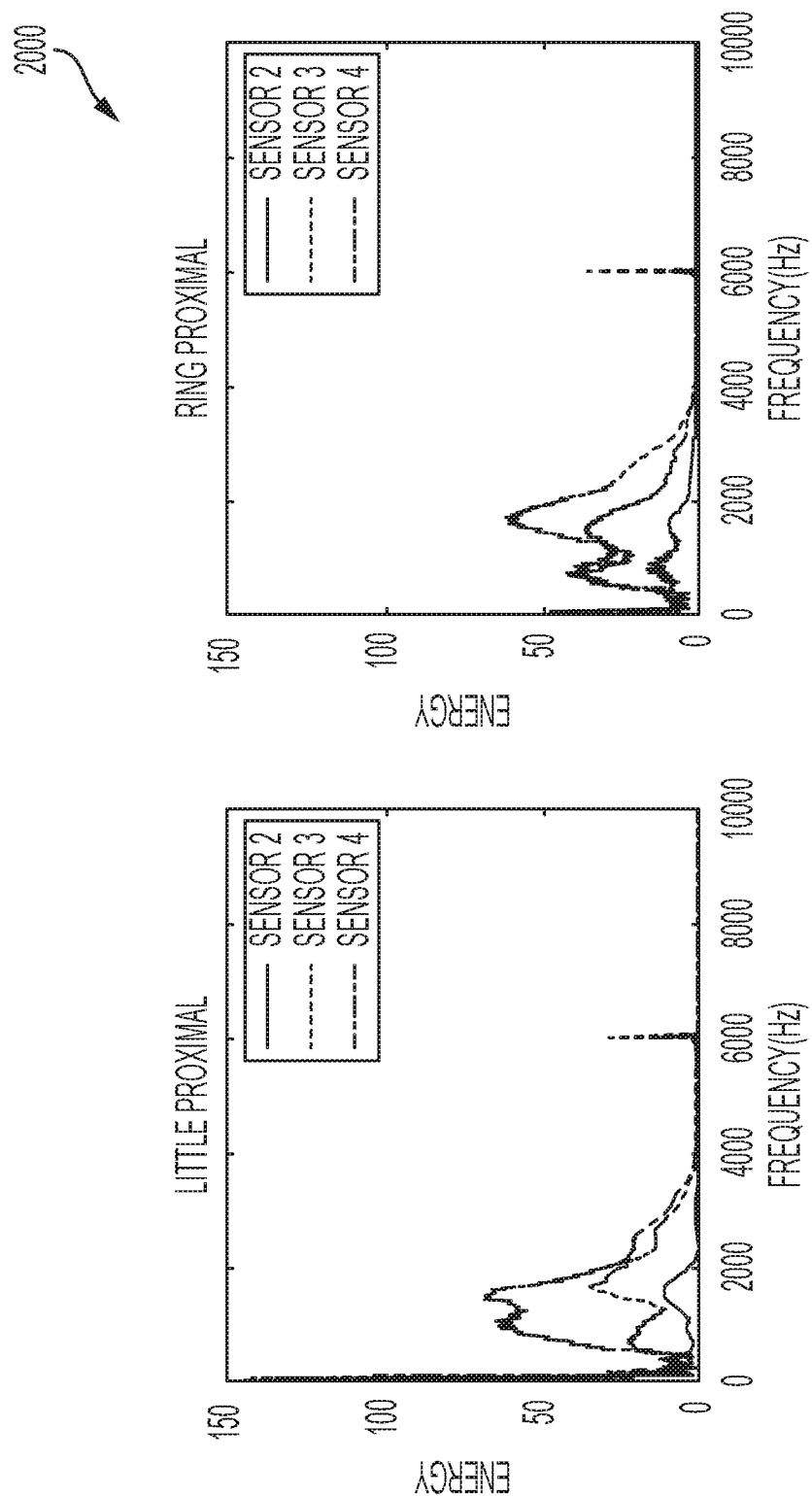
Figure 20:
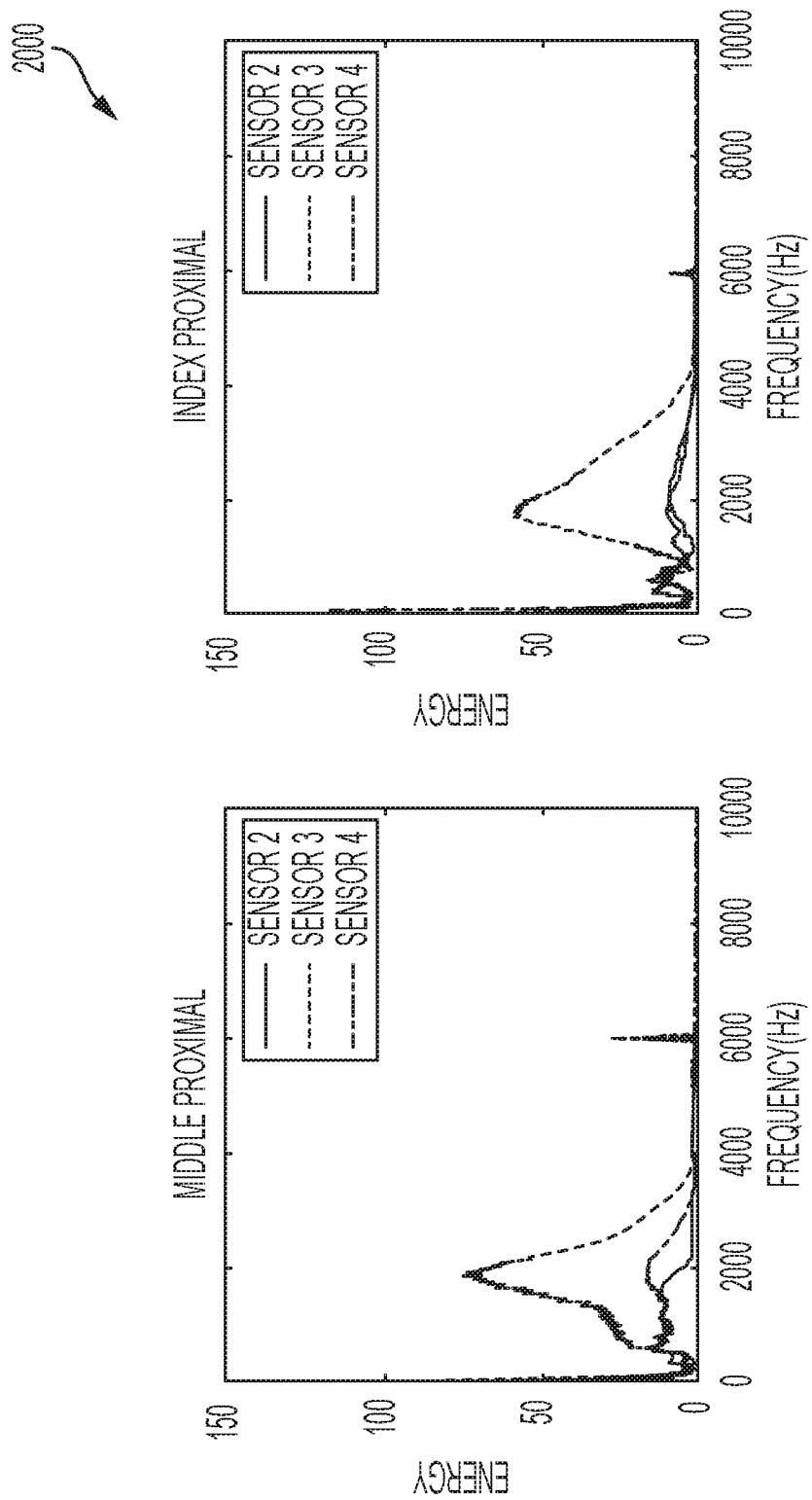

FIG. 20 shows a plurality of frequency responses to contact with each of a plurality of phalanges as performed by a user of a system for sensing and communicating data. As shown, FIG. 20 shows frequency responses of taps on 12 phalanges including: the little distal; the ring distal; the middle distal; the index distal; the little middle; the ring middle; the middle middle; the index middle; the little proximal; the ring proximal; the middle proximal; and the index proximal.

Figure 21:
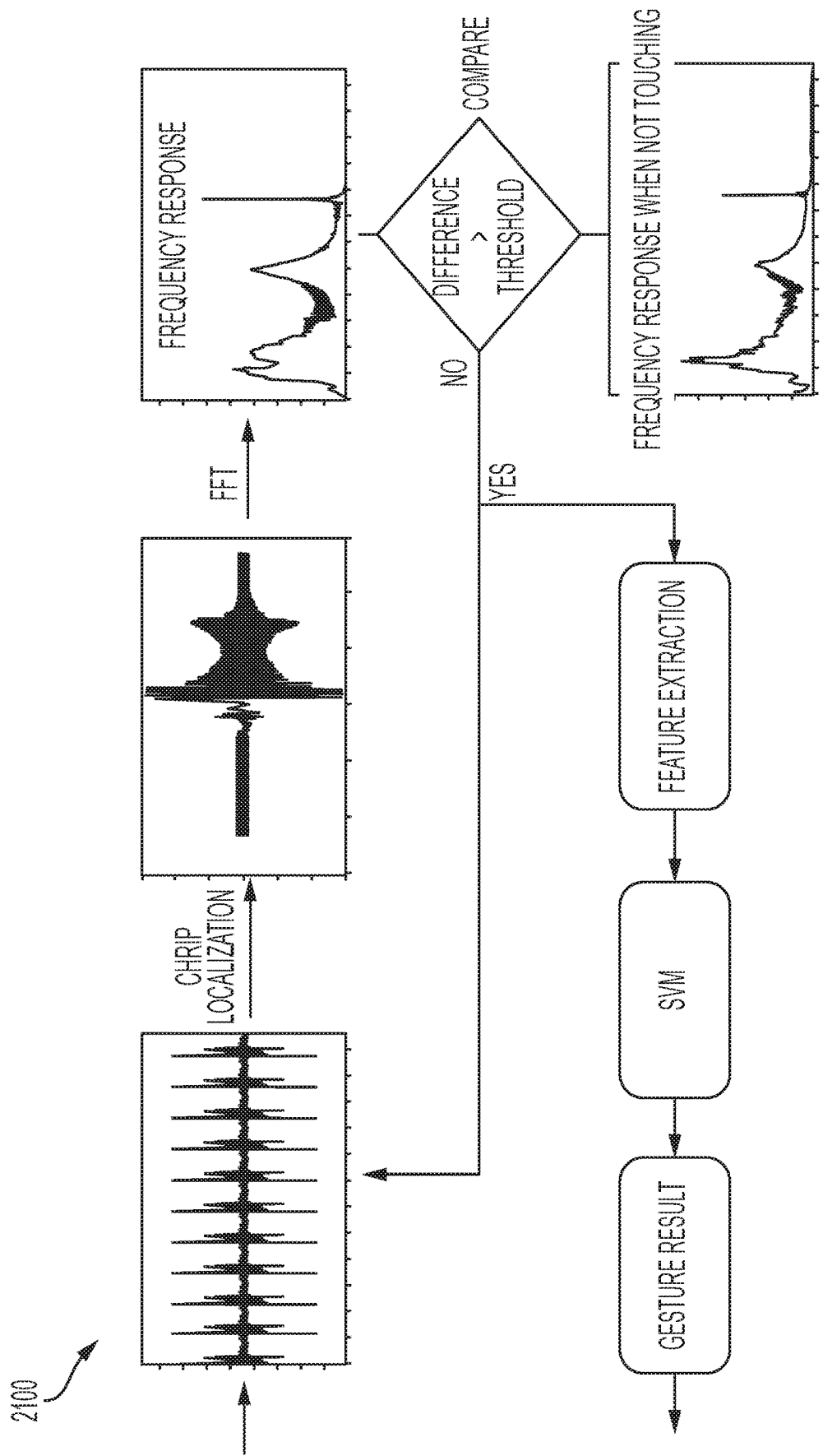
FIG. 21 demonstrates a flow of data processing associated with a system for sensing and communicating data, in accordance with one or more embodiments of the present disclosure.

FIG. 21 demonstrates a flow of data processing associated with a system for sensing and communicating data. The plurality of frequency responses may help perform chirp localization, pose segmentation, pose recognition, and/or the like. To recognize a given pose, chirp localization can be performed prior. Chirp localization includes explicitly localizing (temporally) each chirp within the continuous data stream—segmentation. For instance, the signal associated with a receiver (e.g., microphone) closest to the transducer (e.g., speaker) has the highest amplitude and/or may be least influenced by potential other noise. Peak localization is performed on the audio signal of this channel by finding the maximum absolute amplitude, and then segmenting the chirps from each of a plurality of synchronized channels using a window size of 0.046 seconds (2,048 data points to facilitate the use of Fast Fourier Transformation) centered at the peak position extracted from the first channel.

Pose segmentation is based on comparison to a reference signal. This reference signal is recorded during system start when the user wearing the ring 105 holds his hand still and open, i.e., not performing a pose. The received signals from each of the plurality of receivers are used as a reference. For each segmented chirp, Faster Fourier Transform (FFT) is performed to extract the energy distribution across frequency 0-10 kHz. To detect whether a pose is performed, the Euclidean distance of the FFT results is calculated between the current chirp and the reference chirp recorded during system start as described above. If the distance is larger than an empirically determined threshold, it is inferred that a pose is being performed. The subsequent 0.5 seconds of data from each of the plurality of channels can be used for the hand pose recognition. This data may also be saved for post-analysis.

In some embodiments, the following steps may be performed to accomplish pose recognition. Features from each chirp collected from each of the plurality of channels are extracted. Each chirp is passed through a band-pass filter (100 Hz-5,500 Hz), which is the most informative frequency range based on early exploration. From the filtered chirp, up to 35 features are extracted, namely: zero crossing rate; energy; entropy; spectral centroid; spectral flux; spectral chroma; spectral roll-off; and Mel-frequency cepstral coefficients. Next, the feature vector is extended to 294 by adding the dominant frequency and its energy, as well as spectral energy bins from 100 Hz to 5500 Hz as extracted through the FFT. Finally, the feature vectors of each of the plurality of channels are combined resulting in a global descriptor of dimensionality d=1; 176, which is then fed into a support vector machine pose classification backend. The sequential minimal optimization (SMO) implementation of SVM provided by Weka is used. Since the pose segmentation step actually sends data segments of a length of 0.5 seconds for pose recognition and each chirp takes 0.1 seconds, each channel may contain up to 5 chirps. The final recognition result of a particular pose is thus based on majority voting over the five individual chirp classifications.

FIG. 22A-B, FIG. 23, FIG. 24A-B and FIG. 25 correspond to the following study. The study involved 16 participants (10 male; average age of 26.6). 8 randomly selected participants were requested to test the first pose set (tapping on 12 phalanges) and the remaining 8 participants were instructed to evaluate the second set of poses (digits '1' to '10' from American sign language). At the beginning of the study, a researcher first introduced and demonstrated the poses that the users were required to perform. Then the researcher helped the participant to put the ring 105 and the wearable device 120 on the user's hand and wrist, respectively. Each participant was allowed to practice each pose before they proceeded to the actual test. The study consisted of seven separate sessions. During each session the participants were given visual prompt for the pose to be performed. The first session was a practice session, where each participant was instructed to perform all the poses in a random order with five instances per hand pose. Sessions 2 through 5 were used for collecting the training data, in each of which the participants were requested to perform each pose in a random order with five instances per pose. No feedback was given for these first 5 sessions. The last two sessions were used as testing sessions, where the participants were instructed to perform each pose five times in a random order. Unlike the practice and training sessions, the participants were given feedback for real-time classification results. If the classified pose was recognized as the one the participant was asked to perform then the interface showed an icon of green (red otherwise). Manual ground truth annotation was provided by observing researchers during the user study. The errors caused by the participants from the final analysis were removed where the participants failed to perform the hand pose as the stimuli indicated. As a result, there were 1.5 false positive errors in average in each testing session for both two pose sets.

Figure 22A:
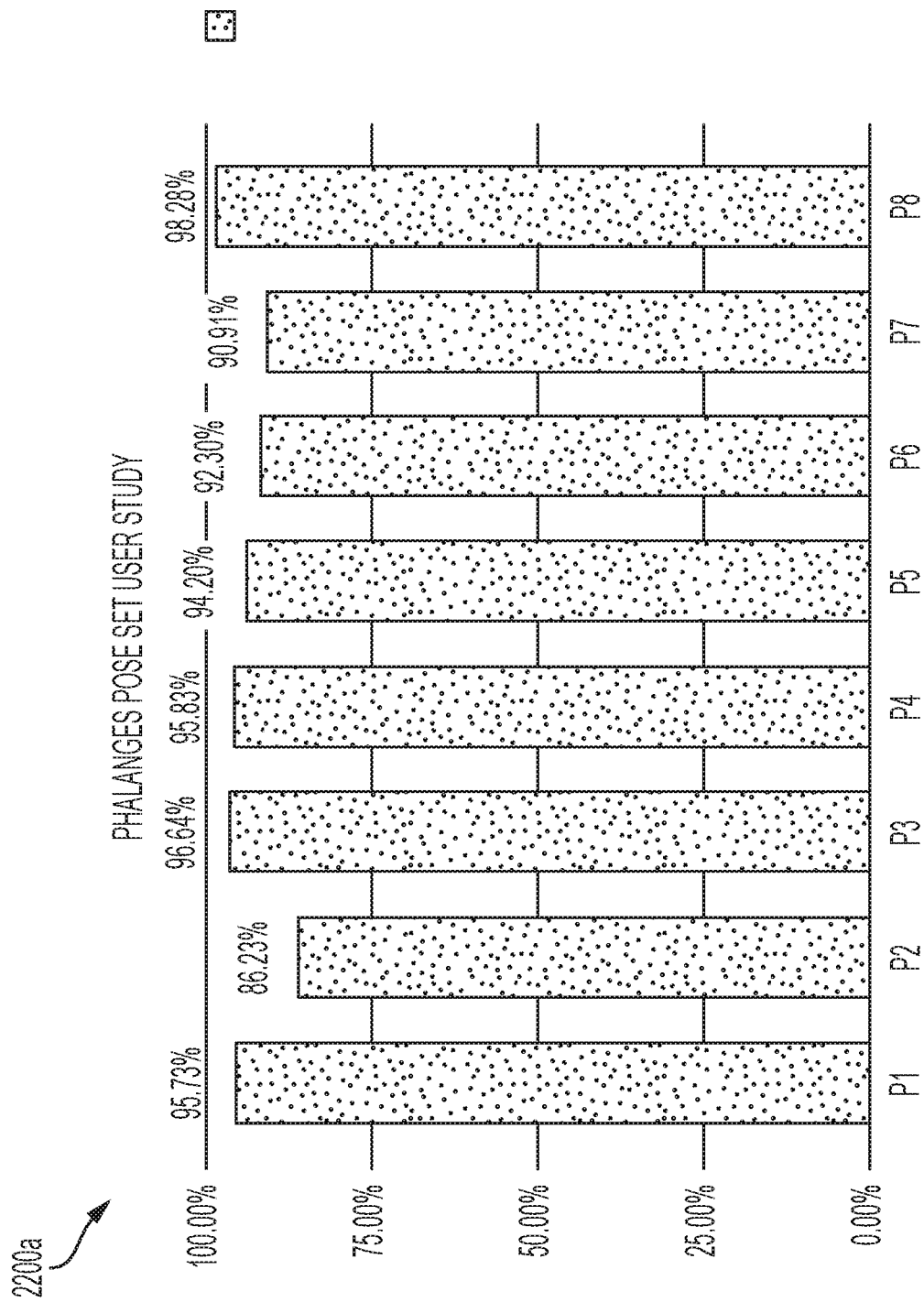
FIG. 22A-B are graphs illustrating the accuracy for a plurality of phalange poses and a plurality of American Sign Language poses, respectively, in accordance with one or more embodiments of the present disclosure.
Figure 22B:
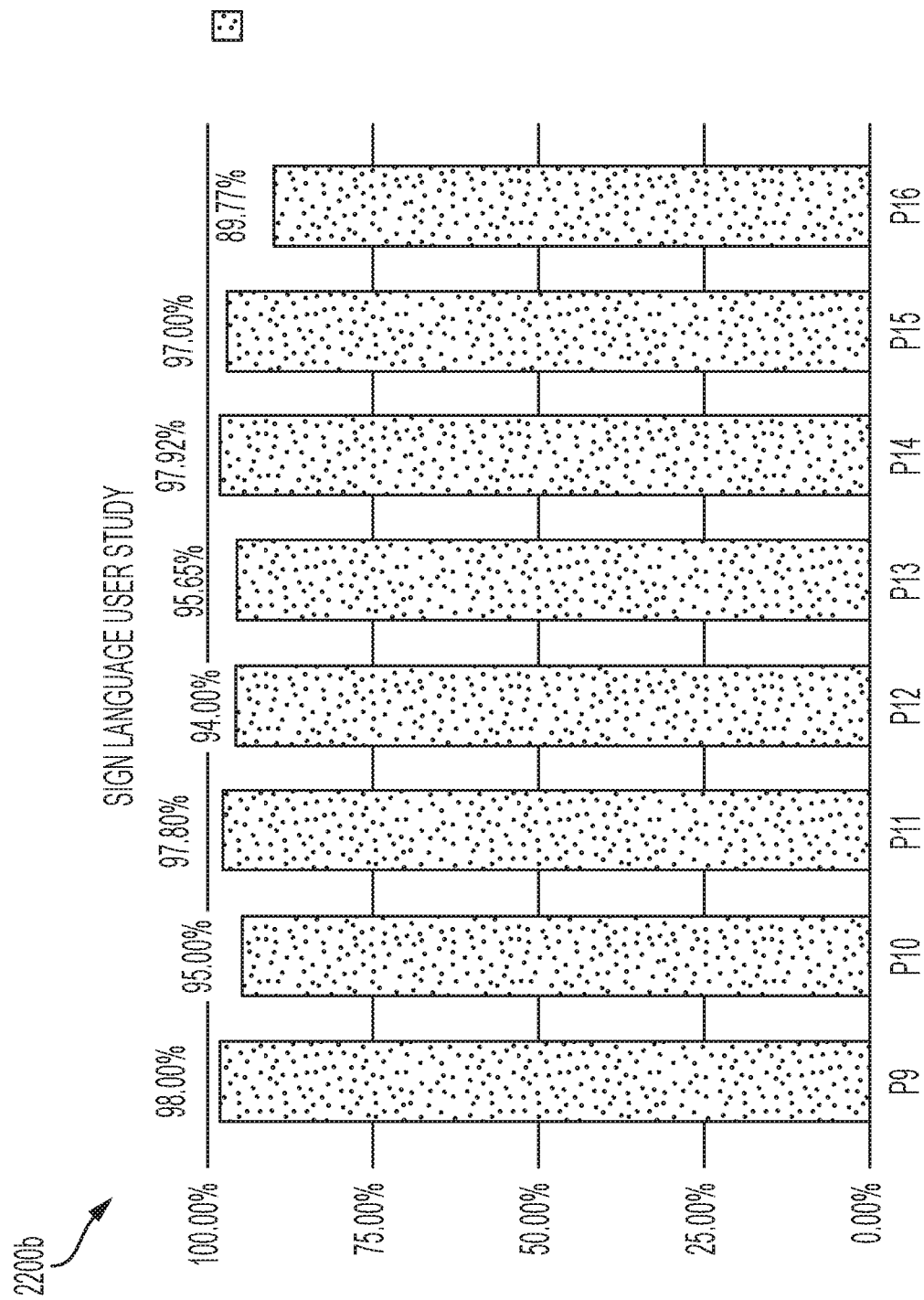

FIG. 22A-B are graphs illustrating the accuracy for a plurality of phalange poses and a plurality of American Sign Language poses. The average accuracy across all participants for the phalanges pose (FIG. 22A) and American sign language (FIG. 22B) are 93.77% and 95.64% respectively. The figures demonstrate that participants in general achieved a relatively high accuracy on recognizing ASL hand configurations. However, an outlier such as P2 (86%), presents a much lower than average accuracy (93%) in performing phalanges poses. Another observation was that participant P2 looked tired in the testing sessions, allowing for ease of distraction. This was an issue of the study setup, which required the participants to keep focused on performing different hand poses for around 30 minutes, which is rarely the case in daily scenarios.

Figure 23:
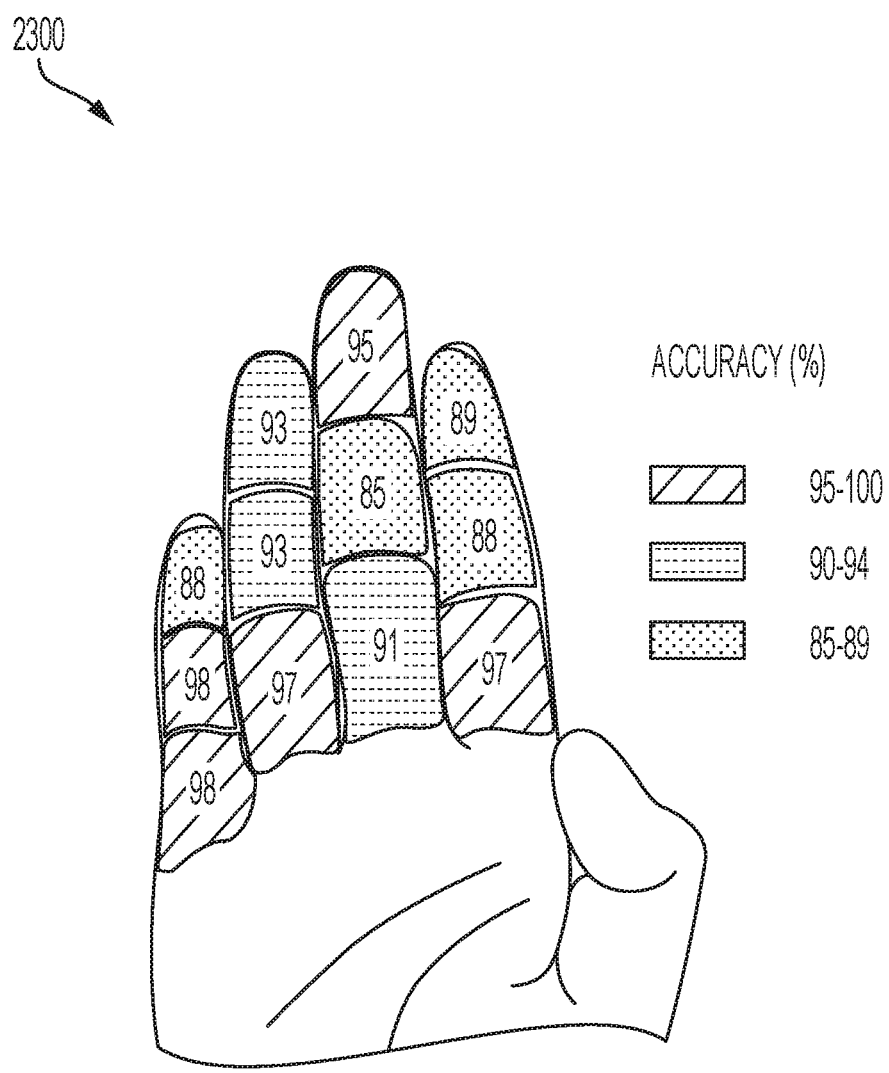
FIG. 23 illustrates the accuracy for a plurality of phalange poses, in accordance with one or more embodiments of the present disclosure.

FIG. 23 illustrates the accuracy for a plurality of phalange poses. For ASL poses, number '10' presents the highest accuracy of 100% and number '5' has the lowest accuracy of 90.54%. It is believed that '10' is the most accurate pose because it is very different from any other pose. Further, it was observed that much confusion existed between poses '7', '8' and '9', which look similar in shapes.

Figure 24A:
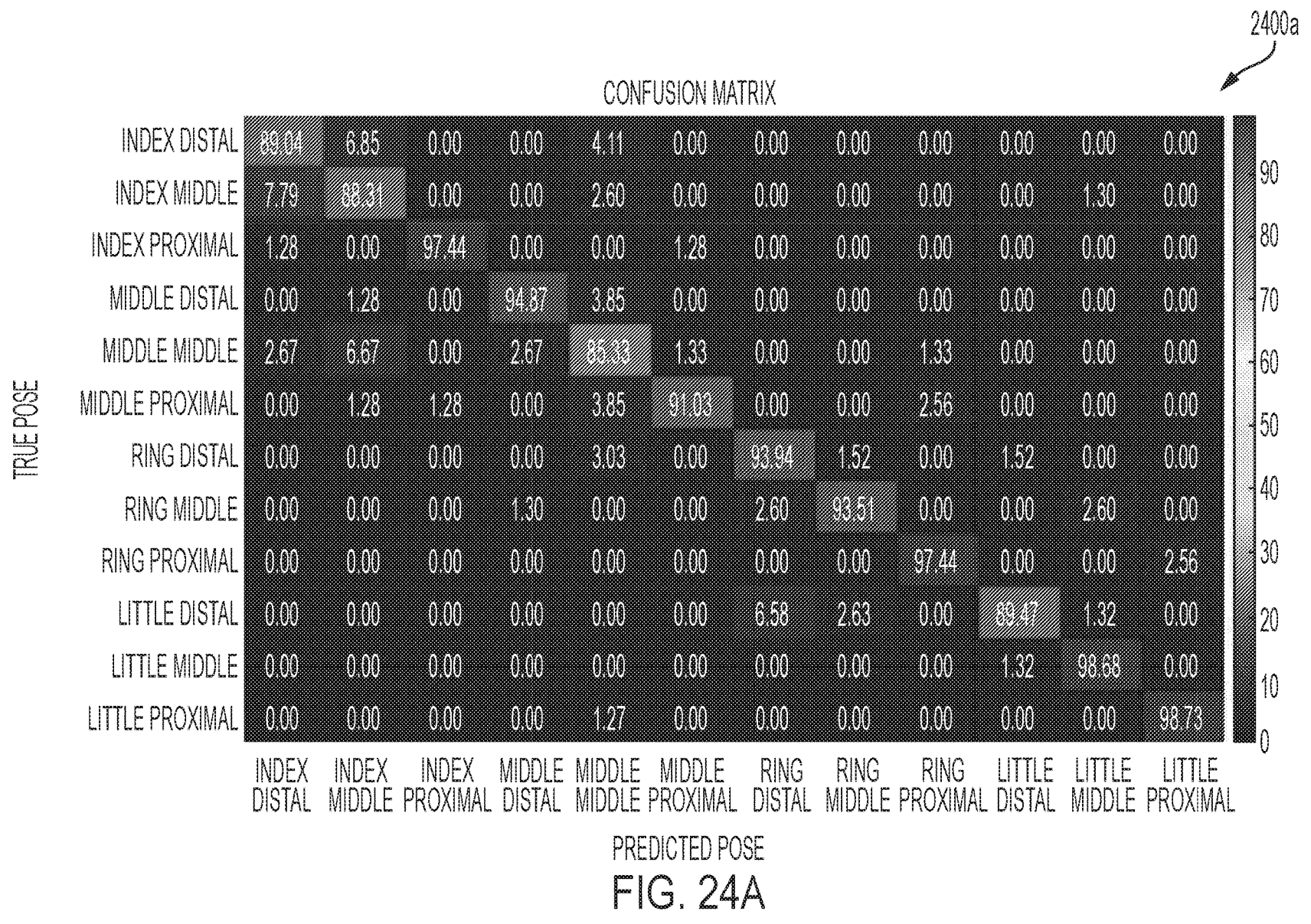
Figure 24B:
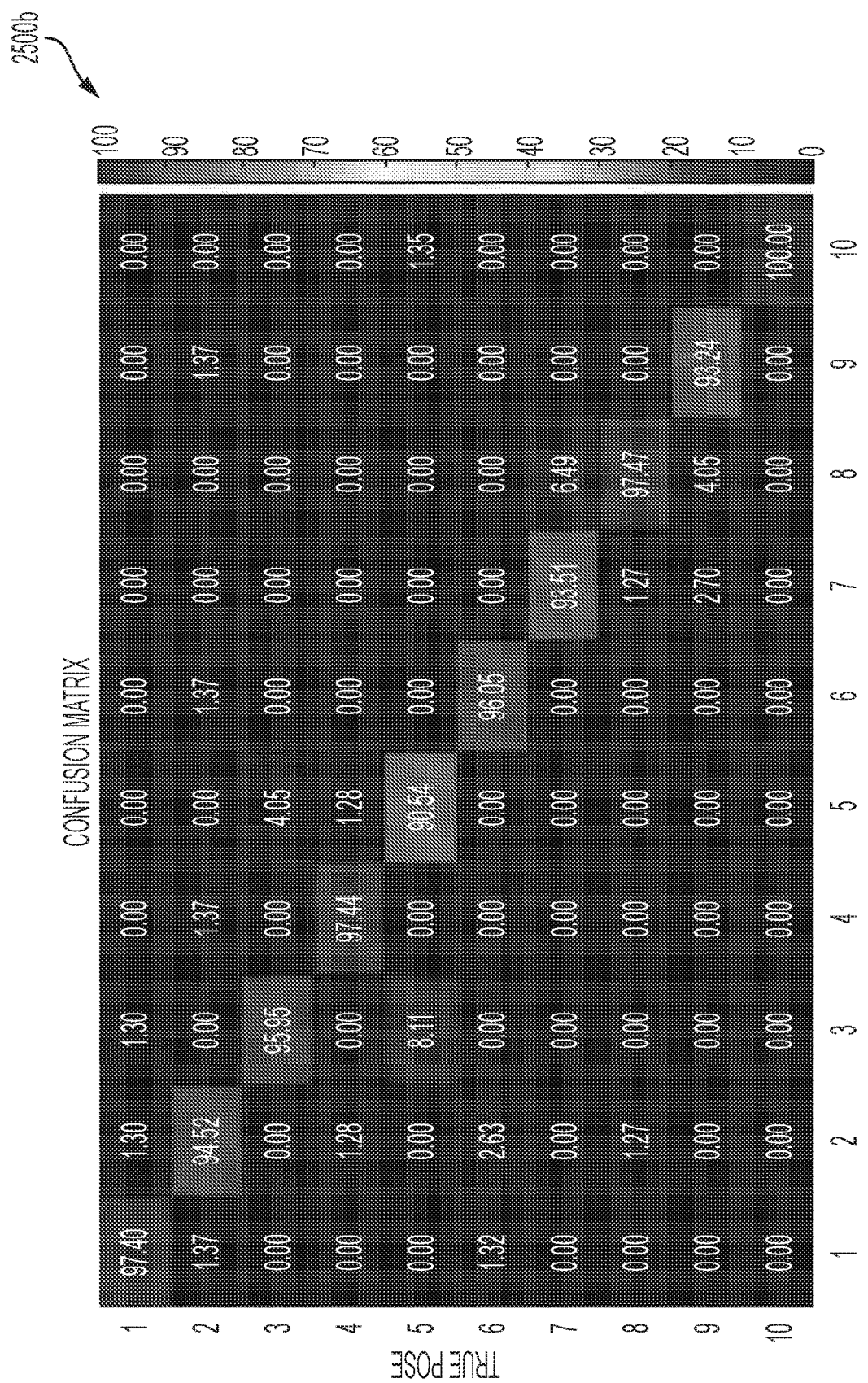

FIG. 24A-B show a confusion matrix for recognizing a plurality of phalange poses and a plurality of American Sign Language poses, respectively. For the 12 phalange poses, recognition was most accurate for touch events involving the little finger and least accurate when the middle finger is targeted, which can be explained through the very similar path propagation compared to both index and ring finger. The other common confusion exists between the similar positions in the neighbor fingers. For instance, 6.58% little-distal was misclassified as ring-distal and 6.67% middle-middle was misclassified as index-middle.

Figure 25:
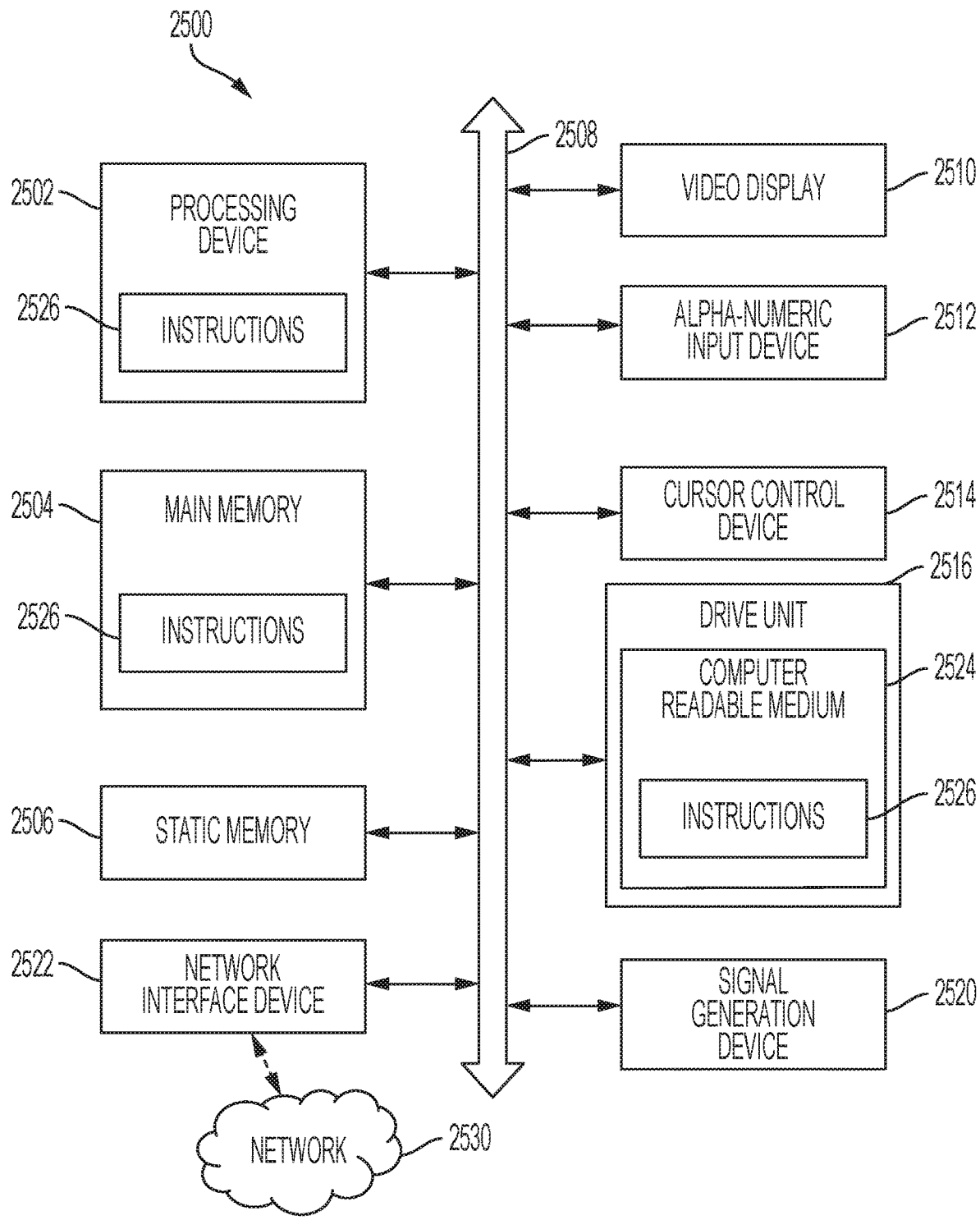
FIG. 25 is a block diagram of an example computer system that may implement certain aspects of the present disclosure.

FIG. 25 is a block diagram of an example computer system 2500 that may implement certain aspects of the present disclosure. The computer system 2500 may include a set of instructions 2526 for controlling operation of the computer system 2500. In some implementations, the computer system 2500 may be connected (e.g., networked) to other machines in a Local Area Network (LAN), an intranet, an extranet, a satellite communications system, or the Internet. The computer system 2500 may operate in the capacity of a server or a client machine in a client-server network environment, or as a peer machine in a peer-to-peer (or distributed) network environment. The computer system 2500 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 2500 is illustrated, the term "machine" shall also be taken to include any collection of machines (e.g., computers) that individually or jointly execute a set (or multiple sets) of instructions to perform any one or more of the methodologies discussed herein.

The computer system 2500 includes a processing device 2502, a main memory 2504 (e.g., read-only memory (ROM), flash memory, dynamic random-access memory (DRAM) such as synchronous DRAM (SDRAM), etc.), a static memory 2506 (e.g., flash memory, static random-access memory (SRAM), etc.), and a secondary memory 2516 (e.g., a data storage device), which communicate with each other via a bus 2508.

The processing device 2502 represents one or more general-purpose processing devices such as a microprocessor, a microcontroller, a central processing unit, or the like. As non-limiting examples, the processing device 2502 may be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 2502 may also be one or more special-purpose processing devices such as an application specific integrated circuit (ASIC), a field programmable gate array (FPGA), a digital signal processor (DSP), network processor, or the like. The processing device 2502 is configured to execute the operations for electronically creating and trading derivative products based on one or more indices relating to volatility.

The computer system 2500 may further include a network interface device 2522, which is connectable to a network 2530. The computer system 2500 also may include a video display unit 2510, i.e., a display (e.g., a liquid crystal display (LCD), a touch screen, or a cathode ray tube (CRT)), an alphanumeric input device 2512 (e.g., a keyboard), a cursor control device 2514 (e.g., a mouse), and a signal generation device 2520 (e.g., a speaker).

The secondary memory 2516 may include a non-transitory storage medium 2524 on which is stored one or more sets of instructions 2526 for the computer system 2500 representing any one or more of the methodologies or functions described herein. For example, the instructions 2526 may include instructions for implementing an asset tracking device including a power source and power management system or subsystem for a container or a trailer. The instructions 2526 for the computer system 2500 may also reside, completely or at least partially, within the main memory 2504 and/or within the processing device 2502 during execution thereof by the computer system 2500, the main memory 2504 and the processing device 2502 also constituting computer-readable storage media.

While the storage medium 2524 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A system comprising:
   a ring configured to be positioned about the thumb comprising:
     a first transducer configured to operate in a first sensing modality during one or more gestures made by a wearer of the ring; and
     a second transducer configured to operate in a second sensing modality during the one or more gestures; and
   a processor;
   wherein each gesture comprises a one-handed gesture of a thumb wearing the ring, each thumb gesture having a duration from a beginning to an end, the duration of each thumb gesture capable of being completed on a first hand of the wearer;
   wherein each thumb gesture has a movement portion sensed by one of the first transducer configured to operate in the first sensing modality or the second transducer configured to operate in the second sensing modality, and a contact portion sensed by the other of the first and second transducer, where the movement and contact portions are not mutually exclusive one from the other;
     the movement portion of each thumb gesture comprising movement of the thumb of the first hand; and
     the contact portion of each thumb gesture comprising contact between the thumb of the first hand with a different portion of the first hand exclusive the thumb;
   wherein the processor is configured to determine gesture classifications based upon the one or more thumb gestures by:
     extracting from sound data from a sound sensing transducer, being one of the first and second transducer, a set of common first features in the frequency domain;
     calculating a derivative of each axis of motion data from a motion sensing transducer, being the other one of the first and second transducer, in order to derive a virtual motion sensing transducer;
     extracting, for each axis of the motion data from the motion sensing transducer and the derived virtual motion sensing transducer, a set of statistical second features; and
     connecting the first and second features together to provide a vector with multiple components used to classify noise from the gesture classifications; and
   wherein the gesture classifications include at least directional controls, the digits 0-9, and the letters of the alphabet.

2. The system of claim 1 further comprising:
   a remote device comprising the processor; and
   a microcontroller configured to transmit at least a portion of the motion and sound data to the remote device;
   wherein the transmitted data enables the remote device to determine the gesture classifications.

3. The system of claim 2, wherein the ring further comprises:
   an amplifier configured to receive the transmitted motion data from the motion sensing transducer configured to sense the movement portion of each thumb gesture and increase an amplitude of at least a portion of the transmitted motion data; and
   a filter configured to filter the amplified motion data to remove data that is not associated with the movement of the thumb.

4. A method for determining a gesture made by the wearer of the system of claim 1 comprising:
   detecting by the ring:
     the sound data being representative of the sounds captured by the sound sensing transducer that are indicative of the contact portion of each thumb gesture; and
     the motion data being representative of the movements by the motion sensing transducer that are indicative of the movement portion of each thumb gesture;
   apportioning the sound data into sound portions;
   determining, by the processor, a maximum energy of each of the sound portions such that each of the sound portions is 100 ms;
   comparing the maximum energy of each of the sound portions to a pre-determined threshold;
   responsive to the maximum energy of at least one of the sound portions exceeding the pre-determined threshold, identifying the respective sound portion as the beginning of the gesture;
   comparing, by the processor, consecutive sound portions subsequent to the beginning of the gesture to the pre-determined threshold;
   responsive to the consecutive sound portions having a maximum energy equal to or greater than the pre-determined threshold, determining the duration of the gesture;
   responsive to the duration of the gesture exceeding a predetermined length of time, analyzing the motion data, wherein analyzing the motion data comprises determining a maximum frequency of the motion data;
   responsive to the maximum frequency falling with a specified range of between is 0.5 Hz-4.4 Hz, identifying each of the sound portions, the consecutive sound portions, and the motion data as the full gesture completed on the first hand of the wearer;
   based on the maximum frequency, determining whether the full gesture is in a set of the gesture classifications; and
   transmitting, by the processor, the full gesture to a remote device if the full gesture is determined to be in the set of gesture classifications.

5. A method comprising:
   receiving sound data captured by a wearable device of a user, the sound data indicative of contact between a first portion of a first hand of the user wearing the wearable device and a second portion of the first hand of the user;
   receiving motion data captured by the wearable device, the motion data indicative of at least a movement of the first portion of the first hand; and
   determining, by a processor, based at least in part on the sound data and the motion data, a user input associated with the contact and the movement comprising:
     amplifying the motion data;
     filtering the amplified data to remove data that is not associated with the movement of the first portion of the first hand;
     extracting from the sound data a set of common first features in the frequency domain;
     calculating a derivative of each axis of the motion data in order to derive a virtual motion sensing transducer of the wearable device;

extracting, for each axis of the motion data from a motion sensing transducer of the wearable device and the derived virtual motion sensing transducer, a set of statistical second features;

connecting the first and second features together to provide a vector with multiple components used to classify noise from a plurality of recognized gestures;

integrating, by the processor, at least a portion of the sound data and the filtered motion data;

analyzing, by the processor, the integrated sound data and motion data to identify a user input associated with the contact and the movement; and determining, by the processor, whether the user input is representative of one or more of the plurality of recognized gestures.

6. The method of claim 5, wherein determining whether the user input is representative of one or more of a plurality of recognized gestures comprises determining whether at least a portion of the integrated sound and motion data has a length exceeding a minimum gesture length.

7. The method of claim 5, wherein the first portion of the first hand of the user is the thumb of the first hand and the second portion of the first hand of the user is a portion of the first hand exclusive the thumb.

8. The method of claim 5 further comprising transmitting the sound data and the motion data from the wearable device to a second wearable device of the user;

wherein the second wearable device comprises the processor.

9. The method of claim 5 further comprising transmitting the sound data and the motion data from the wearable device to a second wearable device of the user;

wherein the second wearable device comprises the processor; and wherein the wearable device is a ring comprising:
  a first transducer configured to receive the sound data; and
  a second transducer configured to receive the motion data;
  wherein the plurality of recognized gestures comprise a one-handed gesture of a thumb wearing the ring, each thumb gesture having a duration from a beginning to an end, the duration of each thumb gesture capable of being completed on a first hand of the wearer;
  wherein the first portion of the first hand is the thumb;
  wherein the second portion of the first hand is a different portion of the first hand exclusive the thumb;
  wherein each thumb gesture has a movement portion and a contact portion that are not mutually exclusive one from the other;
    the movement portion of each thumb gesture comprising movement of the thumb of the first hand; and
    the contact portion of each thumb gesture comprising contact between the thumb of the first hand with a different portion of the first hand exclusive the thumb.

10. The method of claim 5, wherein determining whether the user input is representative of one or more of a plurality of recognized gestures further comprises:

continuously analyzing the sound data to detect input gesture activities using an energy-based sliding window segmentation algorithm;

segmenting the input gesture activities to determine start and end points of potential gestures that match one of the plurality of recognized gestures;

extracting features of the potential gestures; and classifying the potential gestures as being a recognized gesture of the plurality of recognized gestures upon a feature comparison of the potential gestures and features of a recognized gesture.

11. The method of claim 10, wherein segmenting the input gesture activities comprises two-stage filtering comprising:

using a time-based sliding window procedure, extracting analysis windows covering two consecutive seconds of sound data; and within each extracted two-second window, searching for start and end points of the potential gestures.

12. The method of claim 10 further comprising:

segmenting the motion data; and passing the segmented sound and motion data through a support-vector machine (SVM) classifier to detect if the data represents a gesture or noise.

13. A wearable device comprising:

a first transducer comprising a contact microphone configured to operate in a first sensing modality during one or more gestures made by the wearer of the wearable device;

a second transducer configured to operate in a second sensing modality during the one or more gestures; and a third transducer configured to emit sound into a first hand of the wearer;

wherein each gesture comprises a one-handed gesture, having a duration from a beginning to an end, a full duration of each gesture completed on the first hand of the wearer;

wherein each gesture has a movement portion and a contact portion that are not mutually exclusive one from the other;
  the movement portion of each gesture comprising movement of a first finger of the first hand; and
  the contact portion of each gesture comprising contact between the first finger of the first hand with a different portion of the first hand;

wherein the first transducer is configured to capture sounds resultant by the one or more one-handed gestures made by the wearer of the wearable device;

wherein the second transducer is selected from a gyroscope and an inertial measurement unit that is configured to capture movements resultant by the one or more one-handed gestures made by the wearer of the wearable device;

wherein data from the first transducer and the second transducer is processed into gesture classifications based upon the one or more gestures made by the wearer of the wearable device by:
  extracting from sound data from the first transducer a set of common first features in the frequency domain;
  calculating a derivative of each axis of motion data from the second transducer in order to derive a virtual second transducer;
  extracting, for each axis of the motion data from the second transducer and the derived virtual second transducer, a set of statistical second features; and
  connecting the first and second features together to provide a vector with multiple components used to classify noise from the gesture classifications; and wherein the gesture classifications include at least directional controls, the digits 0-9, and the letters of the alphabet.

14. The wearable device of claim 13, wherein the first transducer further comprises one or more additional contact microphones that capture sounds emitted by the third transducer;

wherein the third transducer is configured to emit sounds comprising acoustic chips in the range from 20 Hz to 6 kHz during the one or more one-handed gestures made by the wearer of the wearable device; and wherein data from the contact microphones and the third transducer is processed into the gesture classifications.

\* \* \* \* \*